(12) United States Patent
Takeda et al.

(10) Patent No.: US 7,898,223 B2
(45) Date of Patent: Mar. 1, 2011

(54) ELECTRIC POWER STORAGE SYSTEM USING CAPACITORS AND CONTROL METHOD THEREOF INCLUDING SERIAL-PARALLEL SWITCHING MEANS FOR EACH CIRCUIT BLOCK OF BATTERIES BASED ON DESCENDING ORDER OF BLOCK VOLTAGES

(75) Inventors: Harumi Takeda, Osakasayama (JP); Kazuki Toyama, Sakai (JP)

(73) Assignee: Limited Company TM, Osaka (JP)

( * ) Notice: Subject to any disclaimer, the term of this patent is extended or adjusted under 35 U.S.C. 154(b) by 151 days.

(21) Appl. No.: 12/089,603

(22) PCT Filed: Oct. 19, 2005

(86) PCT No.: PCT/JP2005/019208
§ 371 (c)(1),
(2), (4) Date: Jun. 17, 2008

(87) PCT Pub. No.: WO2007/046138
PCT Pub. Date: Apr. 26, 2007

(65) Prior Publication Data
US 2009/0134851 A1  May 28, 2009

(51) Int. Cl.
*H02J 7/00* (2006.01)
(52) U.S. Cl. .......................... 320/166; 320/117; 320/167
(58) Field of Classification Search .................. 320/117, 320/166, 167
See application file for complete search history.

(56) References Cited

U.S. PATENT DOCUMENTS
5,656,915 A    8/1997   Eaves
(Continued)

FOREIGN PATENT DOCUMENTS
EP    0 609 101 A1    8/1994
(Continued)

OTHER PUBLICATIONS

International Search Report for the Application No. PCT/JP2005/019208 mailed Jan. 24, 2006. Supplementary European Search Report for the Application No. EP 05 79 5874 dated Nov. 13, 2009.

*Primary Examiner* — Edward Tso
*Assistant Examiner* — Manuel Hernandez
(74) *Attorney, Agent, or Firm* — Cheng Law Group, PLLC

(57) ABSTRACT

In an electric power storage system according to the present invention, in the case of charging, a plurality of capacitors of each circuit block of the electric power storage system are switched to a serial connection to initiate the charging. When the output voltage of power storage means reaches the maximum input voltage of DC-AC conversion means, each capacitor of a number j of circuit blocks is switched to a parallel connection in order of higher block voltage. Also up to the time when the maximum input voltage is reached again, each capacitor of a number j of circuit blocks is switched to a parallel connection in order of higher block voltage. In the case of discharging, pluralities of capacitors of each circuit block of the electric power storage system are switched to a parallel connection to initiate the discharging. When the output voltage of power storage means reaches the minimum input voltage of DC-AC conversion means, each capacitor of a number k of circuit blocks is switched to a serial connection in order of higher block voltage. Also up to the time when the minimum input voltage is reached gain, each capacitor of a number k of circuit blocks is switched to a serial connection in order of higher block voltage. Accordingly, the electric power storage system is hardly affected by the capacitance error of the capacitors, and charging/discharging efficiency can be improved.

9 Claims, 16 Drawing Sheets

U.S. PATENT DOCUMENTS

| | | | |
|---|---|---|---|
| 5,960,898 A * | 10/1999 | Okada et al. | 180/65.8 |
| 6,198,645 B1 * | 3/2001 | Kotowski et al. | 363/59 |
| 6,323,623 B1 | 11/2001 | Someya et al. | |
| 2002/0163376 A1 | 11/2002 | Pappalardo et al. | |
| 2003/0128013 A1 * | 7/2003 | Okamura et al. | 320/166 |
| 2005/0023054 A1 | 2/2005 | Weidenheimer et al. | |
| 2005/0212493 A1 * | 9/2005 | Yamaguchi et al. | 320/166 |

FOREIGN PATENT DOCUMENTS

| | | |
|---|---|---|
| JP | 11-215695 A | 8/1999 |
| JP | 2001-275251 A | 10/2001 |
| JP | 2003-111286 A | 4/2003 |
| JP | 3418951 B2 | 4/2003 |
| JP | 2005-287110 A | 10/2005 |

* cited by examiner

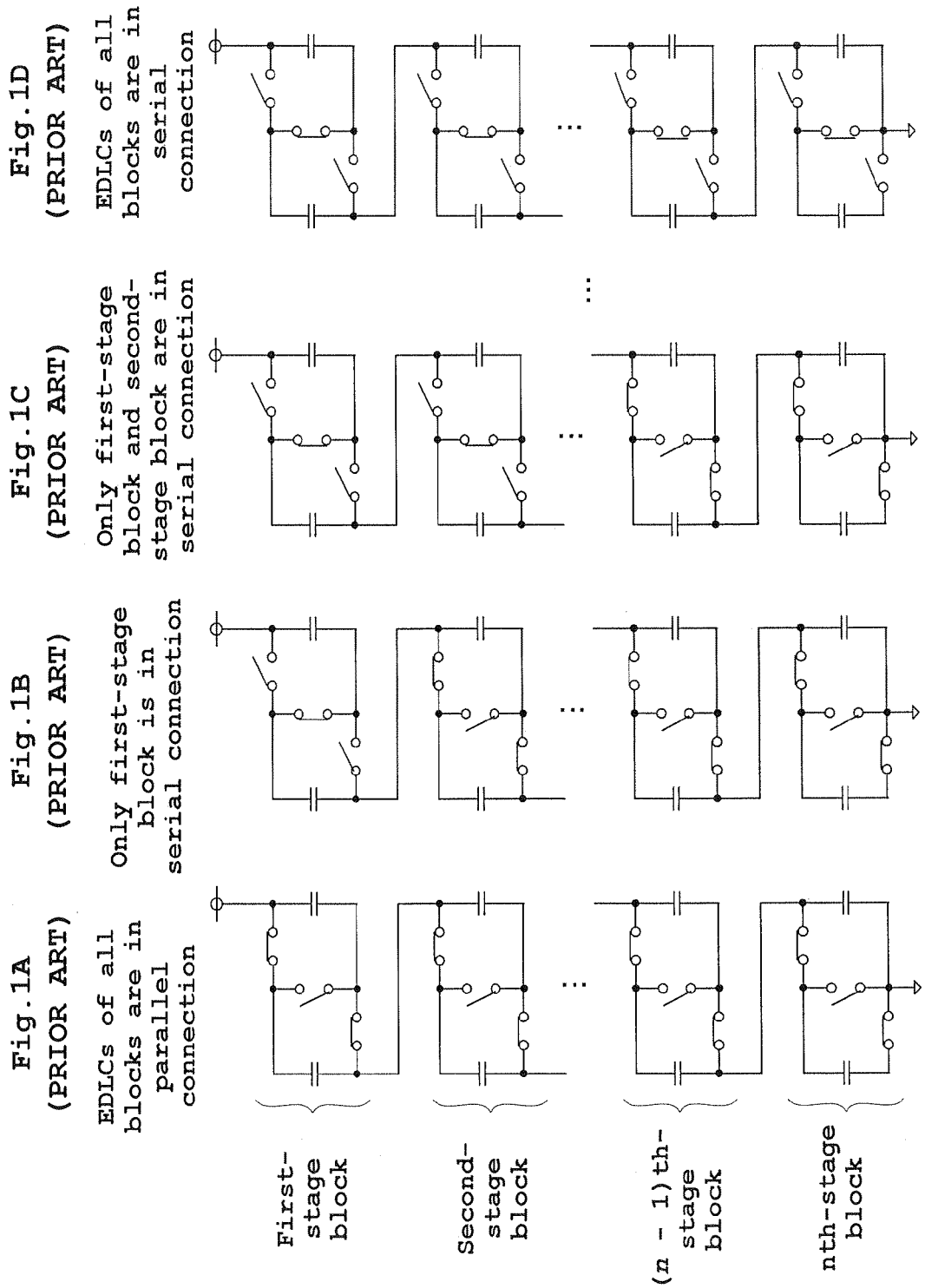

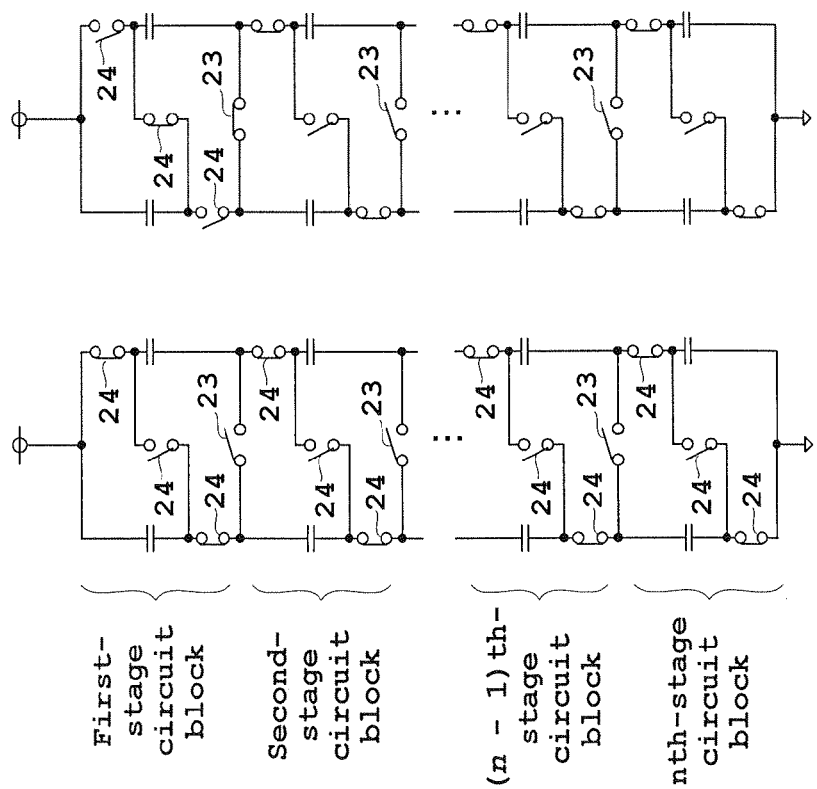
Fig. 7A EDLCs of all circuit blocks are in parallel connection
Fig. 7B Only first-stage circuit block is in serial connection
Fig. 7C Only first-stage circuit block and second-stage circuit block are in serial connection
Fig. 7D EDLCs of all circuit blocks are in serial connection

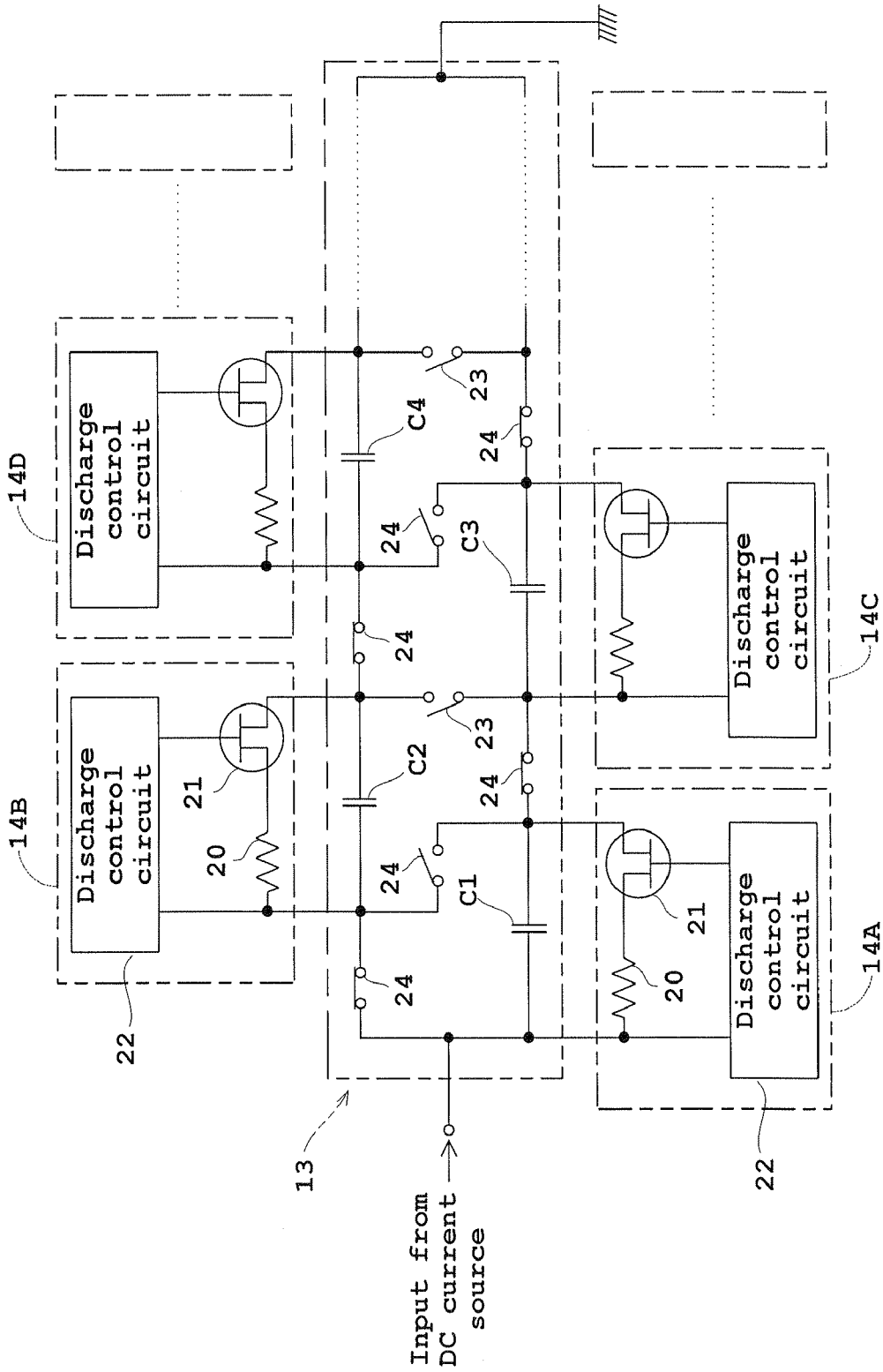

Fig.14A
Fig.14B
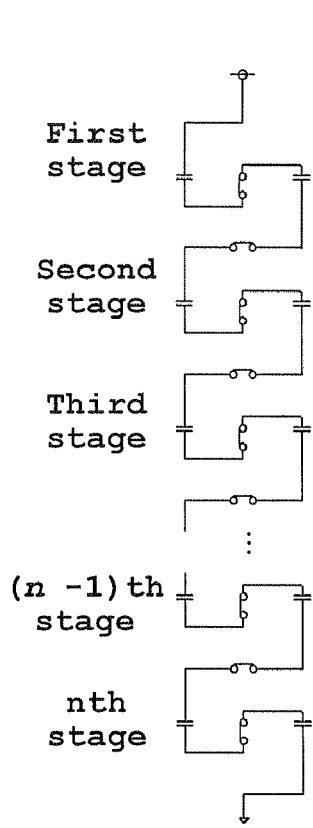
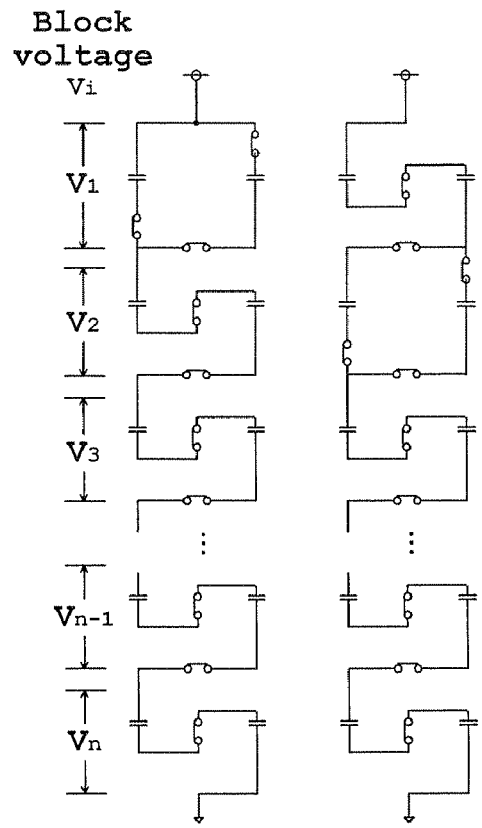
First stage
Second stage
Third stage
$(n-1)$th stage
$n$th stage
Block voltage $V_i$
$V_1$
$V_2$
$V_3$
$V_{n-1}$
$V_n$
Fig.14C
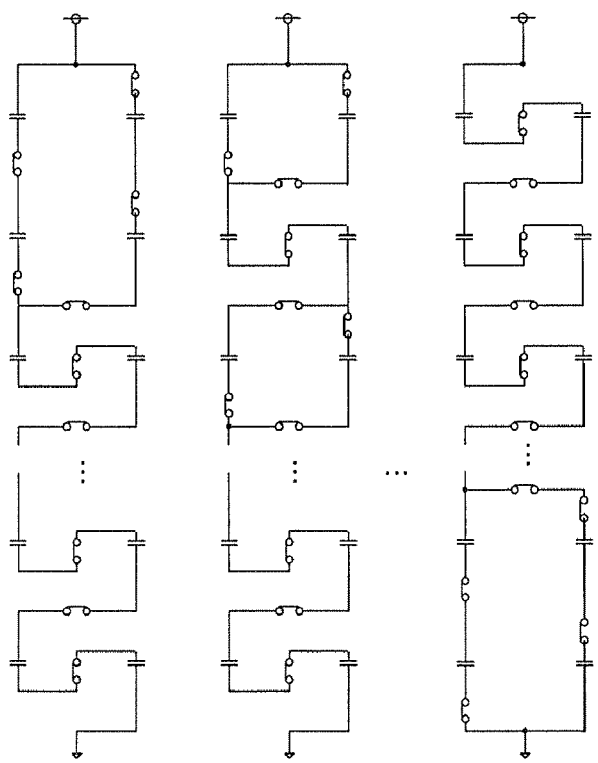

Fig.20A
Fig.20B
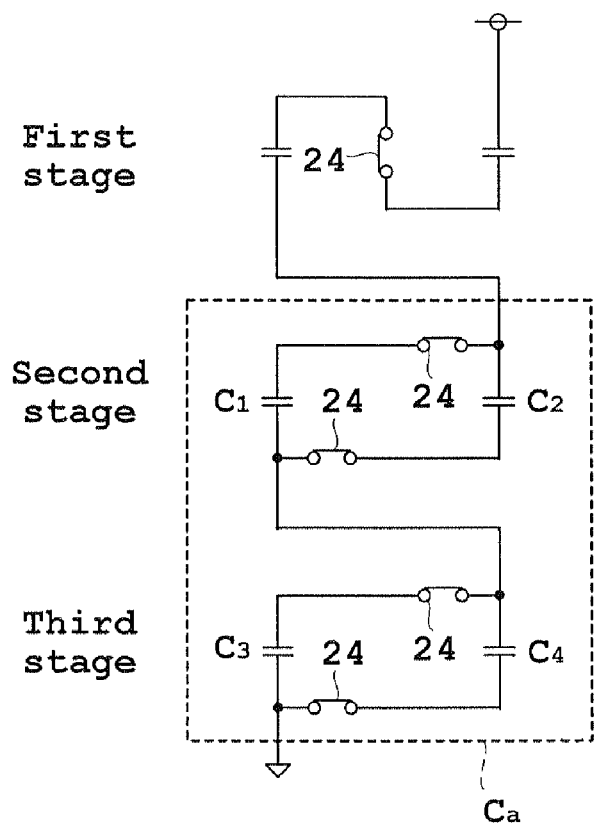
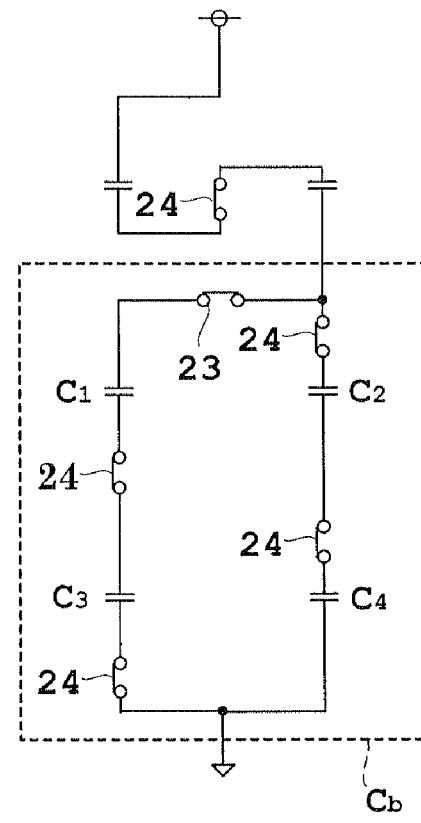

ELECTRIC POWER STORAGE SYSTEM USING CAPACITORS AND CONTROL METHOD THEREOF INCLUDING SERIAL-PARALLEL SWITCHING MEANS FOR EACH CIRCUIT BLOCK OF BATTERIES BASED ON DESCENDING ORDER OF BLOCK VOLTAGES

TECHNICAL FIELD

The present invention relates to an electric power storage system using capacitors such as electric double layer capacitors (EDLCs), and a control method of such an electric power storage system.

BACKGROUND ART

Recently, electric double-layer capacitors (EDLCs) have attracted an attention as new electric power storage device to take a place of secondary batteries due to the features such as a long cycle life and a wide working-temperature range. However, capacitors vary in output voltage in proportion to the electric charge stored, and the output voltage is low when using a single capacitor. Accordingly, it is common to use such capacitors by connecting more than one capacitor in series or in serial-parallel.

A known method in order to supply a stable voltage to a load when capacitors are connected in series or in serial-parallel is such that a plurality of EDLCs are switched between series and serial-parallel using complex switches.

In an electric power storage system constituted from a plurality of EDLCs connected in serial-parallel, in order to improve the charging/discharging efficiency, two control techniques called "bank switching" and "voltage equalizing circuit" are usually used at the same time. The following outlines these control techniques, and describes problems arising when these techniques are used in conjunction.

[Bank Switching]

The conventionally proposed technique of "bank switching" (for example, refer to Japanese Patent Laid-Open No. 11-215695) is to control a plurality of switches that are arranged along with a plurality of EDLCs in multiple stages as shown in FIG. 1A, thereby switching connection states of EDLCs sequentially as shown in FIGS. 1B, 1C and 1D. In the following description, a group of capacitors constituting one stage is called a "block". Further, each capacitor illustrated in the drawings may be constituted by more than one capacitor connected in serial-parallel.

In a discharging process, for example, of a conventional electric power storage system as shown in FIG. 1, every time an output voltage of the electric power storage system falls and becomes close to a minimum input voltage of an inverter as the voltage of each capacitor (EDLC) decreases due to the discharge, a connection among EDLCs in a block in which the EDLCs are connected in parallel is switched to a serial connection sequentially block by block in an order of FIGS. 1A, 1B, and 1C. By this, the output voltage of the electric power storage system is controlled so as to fall into an input range of the inverter, and the electric power storage system outputs the electric power until all the EDLCs are finally connected in series as shown in FIG. 1D. It is noted that EDLCs of a block in which EDLCs have been switched to the serial connection are not switched back to the parallel connection.

Further, in a charging process, every time the output voltage of the electric power storage system rises and becomes close to a maximum input voltage of an inverter as the voltage of each capacitor (EDLC) increases, the connection among EDLCs in a block in which the EDLCs are connected in series is switched to the parallel connection sequentially block by block in a reverse order of the order in the discharging process. It is noted that EDLCs of a block in which EDLCs have been switched to the parallel connection are not switched back to the serial connection.

While the above described conventional "bank switching" technique is effective in improving charging/discharging characteristics or depth of discharge, the following problems have been noted.

(1) Variation in Inter-Terminal Voltages Between Blocks

In the charging process, for example, because the amount of charge accumulated in each EDLC in a block in which EDLCs are connected in parallel becomes half the amount of charge accumulated in each EDLC of a block having EDLCs connected in series, when the EDLCs connected in series in a block in which EDLCs are switched to a parallel connection, a variation in EDLC inter-terminal voltage between the blocks is caused. When a variation in EDLC inter-terminal voltage is caused, the EDLCs in the block in which the EDLCs are connected in series are overcharged unless the inter-terminal voltages of the EDLCs in the block in which the EDLCs are connected in series are maintained to be equal to or lower than than the withstand voltage until the EDLCs in the block having EDLCs switched to a parallel connection are fully charged.

(2) Difference in Charging Characteristics Due to a Difference in the Numbers of EDLCs Constituting Blocks Generally, the system should be constructed so that the number of EDLCs constituting each block is identical. However, in some cases, the number of EDLCs in each block becomes unavoidably different. In such a case, in the charging process, when the connection of the EDLCs of a block having the larger number of EDLCs is switched from series to parallel, the output voltage $V_t$ of the electric power storage system decreases extremely and a large amount of time may thus be required until the EDLCs that have been switched to parallel are charged and the subsequent switching occurs. In the worst case, the output voltage $V_t$ of the electric power storage system may fall below the inverter input voltage range.

Moreover, even if the output voltage $V_t$ of the electric power storage system does not fall below the inverter input voltage range, the EDLC inter-terminal voltages of the blocks becomes largely varied, and consequently, the voltages of the EDLCs which have been fully charged may exceeds withstand voltage the as the charging proceeds, thereby causing breakdown.

(3) Laterally Flowing Current

As shown in FIG. 2, in a charging process, when the connection of EDLCs in a block is switched from a serial connection as shown in FIG. 2A to a parallel connection as shown in FIG. 2B, if there is a variation between inter-terminal voltage $V_1$ of a capacitor (EDLC) $C_1$ and inter-terminal voltage $V_2$ of a capacitor (EDLC) $C_2$, a laterally flowing current is generated. Therefore, in a case in which a semiconductor switch is used as the switch in FIG. 2, the laterally flowing current generated is expressed as $(V_2-V_1)/R$ [A], where an ON resistance of the semiconductor switch is R [Ω], and this could destroy the semiconductor switch.

To prevent the laterally flowing current from being generated, it is necessary to suppress the variation in the inter-terminal voltages of EDLCs that are connected in parallel.

With the above described problems, it is difficult to construct an electric power storage system by using only "bank switching". However, these problems can be avoided by taking the following measures.

(1) Add a control circuit which prevents the inter-terminal voltage of the EDLCs from exceeding the withstand voltage.

(2) Add a control circuit which suppresses a variation in inter-terminal voltage of the EDLCs at all times.

(3) Make the number of EDLCs constituting each block as identical as possible.

In order to realize the above (1) and (2), a circuit called "voltage equalizing circuit" is used.

[Voltage Equalizing Circuit]

The voltage equalizing circuit is a control circuit which suppresses a variation in the inter-terminal voltage of each EDLC and serves to improve the safety of an electric power storage system.

In an electric power storage system based on the bank switching, factors of generation of a variation in the EDLC inter-terminal voltages include "difference of capacitance of each EDLC", "difference in self-discharge characteristics of each EDLC" and "difference in the amount of charge flowing to each EDLC caused by the bank switching". When these multiple factors are combined, the above described three problems arise: (1) A variation in inter-terminal voltage between blocks, (2) Difference in charging characteristics due to a difference in the numbers of EDLCs constituting blocks, and (3) A large laterally flowing current. Suppressing the EDLC inter-terminal voltage by a "voltage equalizing circuit" will be described below.

(1) Prevention of Overcharge

Prevention of overcharging of an EDLC by the voltage equalizing circuit is realized by arranging a resistor and a switch between the terminals of each EDLC. Specifically, the inter-terminal voltage of each EDLC is monitored and the switch connected to an EDLC in which the withstand voltage is about to be exceeded, is turned on, thereby discharging forcibly, and preventing the overcharge. By using the voltage equalizing circuit, the inter-terminal voltage of an EDLC which has reached the fully charged state faster than the other EDLCs, is kept equal to or smaller than the withstand voltage, whereby charging can be safely performed without overcharging. Adjusting the inter-terminal voltage of all the EDLCs to the same value as much as possible in this way is hereinafter referred to as "voltage equalization". In addition, a loss caused by keeping the EDLC inter-terminal voltage equal to or smaller than the withstand voltage is referred to as "voltage equalization loss".

(2) Prevention of Variation in Inter-Terminal Voltages of Capacitors (EDLCs)

The voltage equalizing circuit is also used to suppress the variation in the EDLC inter-terminal voltages. In a conventional manner, voltage equalization ("initialization" in Japanese Patent Laid-Open No. 2003-111286) for reducing the variation in inter-terminal voltages of capacitors is performed only around at a voltage for serial-parallel switching (refer to Japanese Patent Laid-Open No. 2003-111286, for example). In this way, by using the "voltage equalizing circuit" in conjunction with the "bank switching", the "bank switching" can be safely performed to repeat charging and discharging of the EDLCs.

However, in the conventional electric power storage systems described above, the following problems arise when "bank switching" and "voltage equalizing circuit" are used in conjunction.

Actual EDLCs have errors in capacitances. Consequently, in the "conventional bank switching system" in which the connection state can be switched only in a predetermined block order, the following problems arise due to the errors in the total capacitances of the blocks.

Two blocks being in a parallel connection state in a charging process are taken as an example. When a total capacitance of one block is larger than that of the other block, it takes longer for the block with the larger total capacitance to be fully charged. In contrast, it takes shorter for the block with the smaller total capacitance to be fully charged. Consequently, until the block with the larger total capacitance is fully charged, the inter-terminal voltage of EDLC in the block with the smaller total capacitance must be kept equal to or smaller than the withstand voltage. Thus, the time period for overcharging prevention by the "voltage equalizing circuit" becomes longer and forced discharging is uselessly performed, causing a problem of increasing the voltage equalization loss.

Also, when there is only one EDLC having a smaller capacitance within each block, the variation in inter-terminal voltage of other EDLCs belonging to this same block is suppressed based on the inter-terminal voltage of the one EDLC. Accordingly, forced discharging is uselessly performed, causing a problem of deteriorating the charging/discharging characteristics.

Further, in the conventional manner, the voltage equalization ("initialization" in No. 2003-111286) for reducing the variation in inter-terminal voltages of capacitors is performed only around at a voltage for serial-parallel switching in order to prevent the variation in the EDLC inter-terminal voltages. However, when the variation in the inter-terminal voltages is excessively large at the time when the voltage equalization is performed, it takes longer to equalize the voltages, thereby causing a problem of increasing the voltage equalization loss.

One method to solve the above problems is to use EDLCs whose errors in capacitances are small. However, it is not practical to collect EDLCs having a similar capacitance and construct a system, because this leads to the waste of time for measuring capacitance and to an increase in the cost. Particularly, it takes a considerable time to accurately measure the capacitances of large-capacitance EDLCs to be used to construct an electric power storage system with a large-capacitance.

DISCLOSURE OF THE INVENTION

The present invention has been achieved in view of the above-mentioned circumstances, and has an object to provide an electric power storage system using a capacitor hardly affected by the capacitance error of the capacitor and having a high charging/discharging efficiency, and a method thereof.

As a result of diligent study to achieve the above object, the present inventor has gotten the following knowledge. Specifically, one of the large problems for the "conventional bank switching system" is that, for example, in a charging process, the EDLCs within a block having EDLCs once switched to a parallel connection cannot be returned to a serial connection until charging is completed, and the parallel state must be kept until all the EDLCs reaches a fully charged state. Also, in a discharging process, EDLCs within a block having EDLCs once switched to serial connection cannot be returned to a parallel connection until discharging is completed, and the serial state must be kept until all the EDLCs is discharged. Furthermore, there is also a problem that the serial-parallel switching of each block in a charging process is performed only when the output voltage of the electric power storage system becomes the maximum voltage of inverter input, and the serial-parallel switching of each block in a discharging process is performed only when the output voltage of the electric power storage system becomes the minimum voltage of inverter input.

The present inventor has discovered that, due to these reasons, the charging/discharging pattern of EDLC inter-terminal voltage of each block fluctuates, thus increasing the voltage equalization loss and significantly affecting the charging/discharging characteristics. Specifically, in a charging process, if the capacitors of each block can be switched to a parallel connection in order of larger block voltage (when the EDLCs within a circuit block are connected in series, the total voltage $V_b$ of each EDLC inter-terminal voltage is referred to as "block voltage"; when the EDLCs within a circuit block are connected in parallel, the average voltage $V_b$ of each EDLC inter-terminal voltage is referred to as "block voltage") and the EDLCs of a low-block voltage block having EDLCs once switched to a parallel connection can be returned to a serial connection, then charging can be performed more swiftly and voltage equalization loss can also be reduced. Also, in a discharging process, if the capacitors of each block can be switched to a serial connection in order of larger block voltage and the EDLCs of a low-block voltage block having EDLCs once switched to a serial connection can be returned to a parallel connection, then discharging can be performed for a longer time period and depth of discharge can be improved. Accordingly, there will be proposed below a "new bank switching system" in which a variation in inter-terminal voltage of all the capacitors constituting an electric power storage system is reduced by preparing a greater diversity of connection patterns and selecting an optimum connection pattern from among them. Hereinafter, the "conventional bank switching system" is accordingly referred to as the "conventional system"; the inventive "new bank switching system" is accordingly referred to as the "present system".

The present invention based on such knowledge has the following configuration.

Specifically, an electric power storage system using a capacitor according to claim 1 of the present invention described includes: power storage means having a circuit configuration in which n circuit blocks are connected in series, where n is a natural number equal to or larger than two, each of the n circuit blocks including a plurality of capacitors; DC-AC conversion means that converts a DC output voltage from the power storage means into an AC output voltage and supplies the AC voltage to a load; serial-parallel switching means that switches, between parallel and series, a connection of the plurality of capacitors in each circuit block of the power storage means; a plurality of overcharge prevention means, each of which connected in parallel to each of the plurality of capacitors in the power storage means, and has the corresponding capacitor forcibly discharge when a terminal voltage of the capacitor reaches a withstand voltage value; inter-terminal voltage detection means which detects an inter-terminal voltage between the plurality of capacitors of each circuit block of the power storage means; block voltage determination means that determines a block voltage, for each circuit block, based on the inter-terminal voltage of each capacitor detected by the inter-terminal voltage detection means, the block voltage being a voltage of the circuit block; and control means that detects the output voltage of the power storage means and controls the serial-parallel switching means according to a value of the detected voltage, wherein when the power storage means is being charged, the control means performs: a first process of controlling the serial-parallel switching means so that the plurality of capacitors of each circuit block of the power storage means are connected in series at the beginning of charging the power storage means; a second process of controlling the serial-parallel switching means, when the output voltage of the power storage means reaches the maximum input voltage of the DC-AC conversion means, so that the connection of the plurality of capacitors of each of j circuit blocks in the descending order of block voltages determined by the block voltage determination means are switched to the parallel connection, where j is a natural number up to n indicating the number of times that an input voltage reaches the maximum input voltage during one charging process; and a third process of controlling the serial-parallel switching means, until the output voltage of the power storage means reaches the maximum input voltage of the DC-AC conversion means, so that the connection of the plurality of capacitors of each of j circuit blocks in the descending order of the block voltages determined by the block voltage determination means are switched to the parallel connection, and when the power storage means is being discharged, the control means performs: a fourth process of controlling the serial-parallel switching means so that the plurality of capacitors of each circuit block of the power storage means are connected in parallel at the beginning of discharging the power storage means; a fifth process of controlling the serial-parallel switching means, when the output voltage of the power storage means reaches the minimum input voltage of the DC-AC conversion means, so that the connection of the plurality of capacitors of each of k circuit blocks in the descending order of block voltages determined by the block voltage determination means are switched to the serial connection, where k is a natural number up to n indicating the number of times that an input voltage reaches the minimum input voltage during one discharging process; and a sixth process of controlling the serial-parallel switching means, until the output voltage of the power storage means reaches the minimum input voltage of the DC-AC conversion means, so that the connection of the plurality of capacitors of each of k circuit blocks in the descending order of the block voltages determined by the block voltage determination means are switched to the serial connection.

The wordings "at the beginning of charging the power storage means" used in the present specification designates a point of time when charges are scarcely accumulated in each capacitor within the power storage means. However, the expression also designates a point of time when charges are not at all accumulated in each capacitor within the power storage means, or a point of time when charges are accumulated in each capacitor within the power storage means only to the extent that the minimum input voltage of the DC-AC conversion means is not reached. The expression "at the beginning of discharging the power storage means" used in the present specification designates a point of time when all the capacitors within the power storage means are charged to approximately full capacity. However, the expression also designates a point of time when all the capacitors within the power storage means are charged to full capacity, or a point of time when charges are accumulated in each capacitor within the power storage means to the extent that the minimum input voltage of the DC-AC conversion means is exceeded when the capacitors of all the circuit blocks are connected in parallel.

The operation and effect of the electric power storage system according to the present invention are as follows.

When the power storage means is charged, firstly a plurality of capacitors of each circuit block of the power storage means are switched to a serial connection at the beginning of charging the power storage means (the first process). Subsequently, when the output voltage of the power storage means reaches the maximum input voltage of the DC-AC conversion means, a plurality of capacitors of a number j (j is the number of times that an input voltage of the DC-AC conversion means reaches maximum input voltage during one charging process, and being a natural number up to n) of circuit blocks are switched to a parallel connection in order of higher block voltage determined by the block voltage determination means (the second process). Also up to the time when the output voltage of the power storage means reaches again the maximum input voltage of the DC-AC conversion means, a plurality of capacitors of a number j of circuit blocks are switched to a parallel connection in order of higher block voltage determined by the block voltage determination means (the third process).

Accordingly, in a charging process, after changing a plurality of capacitors of each circuit block of the power storage means to a serial connection, charging of the power storage means is initiated. Then when the output voltage of the power storage means reaches the maximum input voltage of the DC-AC conversion means, the capacitors of a circuit block having a highest block voltage from among the plurality of circuit blocks, i.e., the capacitors of a circuit block having a small total capacitance are switched to a parallel connection, whereby the voltage equalization loss in this same circuit block can be reduced, and at the same time the capacitors of a circuit block having a large total capacitance remains connected in series, whereby charging of this same circuit block can have priority and the charging efficiency can be improved. Also, at the time of subsequent switching, i.e., at the time when the output voltage of the power storage means reaches again the maximum input voltage of the DC-AC conversion means, the capacitors of a number j of circuit blocks are switched to a parallel connection in order of highest block voltage, including returning to a parallel connection the capacitors of a circuit block in which capacitors are connected in series at that time. Also up to the time when a subsequent time of switching is reached, i.e., up to the time when the output voltage of the power storage means reaches again the maximum input voltage of the DC-AC conversion means, the capacitors of a number j of circuit blocks are similarly switched to a parallel connection in order of highest block voltage, whereby the voltage equalization loss can be reduced and at the same time the capacitors of a circuit block having a large total capacitance remains connected in series, whereby charging of this same circuit block can have priority and the charging efficiency can be improved.

Specifically, in a charging process, many capacitor serial-parallel patterns with respect to a plurality of circuit blocks can be realized. Furthermore, an optimum serial-parallel pattern can be selected from among the many capacitor serial-parallel patterns. At the time of subsequent switching, a selection of an optimum serial-parallel pattern is made to perform switching, including returning to a parallel connection the capacitors of a circuit block in which capacitors are connected in series at that time. Furthermore, also up to the time when a subsequent time of switching is reached, i.e., up to the time when the output voltage of the power storage means reaches again the maximum input voltage of the DC-AC conversion means, a selection of an optimum serial-parallel pattern is made to perform switching, including returning to a parallel connection the capacitors of a circuit block in which capacitors are connected in series at that time.

When the power storage means is discharged, firstly a plurality of capacitors of each circuit block of the power storage means are switched to a parallel connection at the beginning of discharging the power storage means (the fourth process). Subsequently, when the output voltage of the power storage means reaches the minimum input voltage of the DC-AC conversion means, a plurality of capacitors of a number k (k is the number of times that an input voltage of the DC-AC conversion means reaches the minimum input voltage during one charging process, and being a natural number up to n) of circuit blocks are switched to a serial connection in order of higher block voltage determined by the block voltage determination means (the fifth process). Also up to the time when the output voltage of the power storage means reaches again the minimum input voltage of the DC-AC conversion means, a plurality of capacitors of a number k of circuit blocks are switched to a serial connection in order of higher block voltage determined by the block voltage determination means (the sixth process).

Accordingly, in a discharging process, after changing a plurality of capacitors of each circuit block of the power storage means to a parallel connection, discharging of the power storage means is initiated. Then when the output voltage of the power storage means reaches the minimum input voltage of the DC-AC conversion means, in order of highest block voltage from among the plurality of circuit blocks, the capacitors of the circuit block are switched to a serial connection, i.e., the capacitors of a circuit block having a large total capacitance are switched to a serial connection. Also, at the time of subsequent switching, i.e., at the time when the output voltage of the power storage means reaches again the minimum input voltage of the DC-AC conversion means, the capacitors of a number k of circuit blocks are switched to serial connection in order of highest block voltage, including returning to a parallel connection the capacitors of a circuit block in which capacitors are connected in series at that time. Also up to the time when a subsequent time of switching is reached, i.e., up to the time when the output voltage of the power storage means reaches again the minimum input voltage of the DC-AC conversion means, the capacitors of a number k of circuit blocks are similarly switched to a serial connection in order of highest block voltage, whereby the charges of each circuit block can be uniformly discharged and the depth of discharge can be improved. Specifically, in a discharging process, many capacitor serial-parallel patterns with respect to a plurality of circuit blocks can be realized. Furthermore, a switchover can be made to an optimum serial-parallel pattern selected from among the many capacitor serial-parallel patterns. At the time of subsequent switching, a selection of an optimum serial-parallel pattern is made to perform switching, including returning to a parallel connection the capacitors of a circuit block in which capacitors are connected in series at that time.

Consequently, it is possible to provide an electric power storage system using a capacitor hardly affected by the capacitance error of the capacitor and having a high charging/discharging efficiency.

Even when a DC-DC conversion means for converting a DC output voltage from the power storage means to a predetermined DC output voltage and supplying the resultant voltage to a load, is employed instead of the above described DC-AC conversion means of the electric power storage system, a similar operation and effect as above are obtained.

The wordings "at the beginning of charging the power storage means" used in the present specification designates a point of time when charges are scarcely accumulated in each capacitor within the power storage means. However, the expression also designates a point of time when charges are not at all accumulated in each capacitor within the power storage means, or a point of time when charges are accumulated in each capacitor within the power storage means only to the extent that the minimum input voltage of the DC-DC conversion means is not reached. The expression "at the beginning of discharging the power storage means" used in the present specification designates a point of time when all the capacitors within the power storage means are charged to approximately full capacity. However, the expression also designates a point of time when all the capacitors within the power storage means are charged to full capacity, or a point of time when charges are accumulated in each capacitor within the power storage means to the extent that the minimum input voltage of the DC-DC conversion means is exceeded when the capacitors of all the circuit blocks are connected in parallel.

Further, the control means may perform the third process and sixth process each time when a predetermined interval passes. In this case, each time the interval time passes, an optimum serial-parallel pattern is selected to perform switching. Accordingly, the charging/discharging efficiency up to the time when a subsequent time of switching is reached can be improved.

Moreover, the control means selects the charging control or the discharging control of the power storage means based on a comparison between an input current to the power storage means and an output current from the power storage means. Accordingly, even when charging and discharging are repeated at random, it is possible to provide an electric power storage system using a capacitor hardly affected by the capacitance error of the capacitor and having a high charging/discharging efficiency.

In addition, switches for selecting conduction or non-conduction are provided between each two circuit blocks of the power storage means, and the control means turns off a switch out of the switches that is positioned between the circuit blocks in which the capacitors are connected in parallel. Accordingly, the charging time can be reduced and the charging efficiency can be improved.

Furthermore, in order to equalize the inter-terminal voltage of the capacitors of each block as much as possible, the control means performs a seventh process when the power storage means is charged or discharged, of setting a lowest inter-terminal voltage out of inter-terminal voltages of the capacitors of one block detected by the inter-terminal voltage detection means as a reference value, and of controlling the overcharge prevention means so that a capacitor having an inter-terminal voltage exceeding a value of the lowest inter-terminal voltage added by a tolerance out of the capacitors of the circuit block is forcibly discharged. Accordingly, a variation in inter-terminal voltage of each capacitor can be corrected to fall into an allowable range (a fixed range), whereby it is possible to prevent the switch from being broken by laterally flowing current associated with serial-parallel switching.

Also, the control means performs the seventh process each time when a predetermined interval passes. Accordingly, a variation in inter-terminal voltage of each capacitor can be monitored for each predetermined interval time and the inter-terminal voltage of each capacitor can be corrected by the overcharge prevention means to fall into an allowable range (a fixed range) at all times, whereby it is possible to prevent the switch from being broken by laterally flowing current associated with serial-parallel switching. Also, by correcting the inter-terminal voltage at all times before a large variation thereof occurs, the voltage equalization loss can be suppressed.

Moreover, when the power storage means is charged, a control method for an electric power storage system using a capacitor performs a first process of controlling the serial-parallel switching means so that the plurality of capacitors of each circuit block of the power storage means are connected in series at the beginning of charging the power storage means; a second process of controlling the serial-parallel switching means, when the output voltage of the power storage means reaches the maximum input voltage of the DC-AC conversion means, so that the connection of the plurality of capacitors of each of j circuit blocks in the descending order of block voltages determined by the block voltage determination means are switched to the parallel connection, where j is a natural number up to n indicating the number of times that an input voltage reaches the maximum input voltage during one charging process; and a third process of controlling the serial-parallel switching means, until the output voltage of the power storage means reaches the maximum input voltage of the DC-AC conversion means, so that the connection of the plurality of capacitors of each of j circuit blocks in the descending order of the block voltages determined by the block voltage determination means are switched to the parallel connection, and when the power storage means is being discharged, the method performs a fourth process of controlling the serial-parallel switching means so that the plurality of capacitors of each circuit block of the power storage means are connected in parallel at the beginning of discharging the power storage means; a fifth process of controlling the serial-parallel switching means, when the output voltage of the power storage means reaches the minimum input voltage of the DC-AC conversion means, so that the connection of the plurality of capacitors of each of k circuit blocks in the descending order of block voltages determined by the block voltage determination means are switched to the serial connection, where k is a natural number up to n indicating the number of times that an input voltage reaches the minimum input voltage during one discharging process; and a sixth process of controlling the serial-parallel switching means, until the output voltage of the power storage means reaches the minimum input voltage of the DC-AC conversion means, so that the connection of the plurality of capacitors of each of k circuit blocks in the descending order of the block voltages determined by the block voltage determination means are switched to the serial connection. By this, an operation effect similar to that of claim 1 described above can be obtained.

In the above described control method, when the DC-AC conversion means is replaced with DC-DC conversion means, also, a similar operation effect is obtained.

BRIEF DESCRIPTION OF THE DRAWINGS

FIG. 1 is a circuit diagram showing a conventional bank switching;

FIG. 7 is a circuit diagram showing a configuration of a capacitor group and a serial-parallel switching circuit according to an embodiment 1;

FIG. 8 is a circuit diagram of a voltage equalizing circuit group;

FIGS. 14A to 14C are views showing an example of a connection pattern in which n stages of circuit blocks are connected;

FIGS. 20A and 20B are views for explaining the difference between when a switch is provided between circuit blocks and when a switch is not provided between circuit blocks.

BEST MODE FOR CARRYING OUT THE INVENTION

In the electric power storage system using a capacitor, when the power storage means is charged, control means performs a first process of controlling the serial-parallel switching means so that the plurality of capacitors of each circuit block of the power storage means are connected in series at the beginning of charging the power storage means; a second process of controlling the serial-parallel switching means, when the output voltage of the power storage means reaches a maximum input voltage of the DC-AC conversion means, so that the connection of the plurality of capacitors of each of j circuit blocks in the descending order of block voltages determined by the block voltage determination means are switched to the parallel connection, where j is a natural number up to n indicating the number of times that an input voltage reaches the maximum input voltage during one charging process; and a third process of controlling the serial-parallel switching means, until the output voltage of the power storage means reaches the maximum input voltage of the DC-AC conversion means, so that the connection of the plurality of capacitors of each of j circuit blocks in the descending order of the block voltages determined by the block voltage determination means are switched to the parallel connection, and when the power storage means is being discharged, the control means performs: a fourth process of controlling the serial-parallel switching means so that the plurality of capacitors of each circuit block of the power storage means are connected in parallel at the beginning of discharging the power storage means; a fifth process of controlling the serial-parallel switching means, when the output voltage of the power storage means reaches a minimum input voltage of the DC-AC conversion means, so that the connection of the plurality of capacitors of each of k circuit blocks in the descending order of block voltages determined by the block voltage determination means are switched to the serial connection, where k is a natural number up to n indicating the number of times that an input voltage reaches the minimum input voltage during one discharging process; and a sixth process of controlling the serial-parallel switching means, until the output voltage of the power storage means reaches the minimum input voltage of the DC-AC conversion means, so that the connection of the plurality of capacitors of each of k circuit blocks in the descending order of the block voltages determined by the block voltage determination means are switched to the serial connection. By this, the object is achieved of providing an electric power storage system using a capacitor hardly affected by the capacitance error of the capacitor and having a high charging/discharging efficiency.

EMBODIMENT 1

Figure 6:
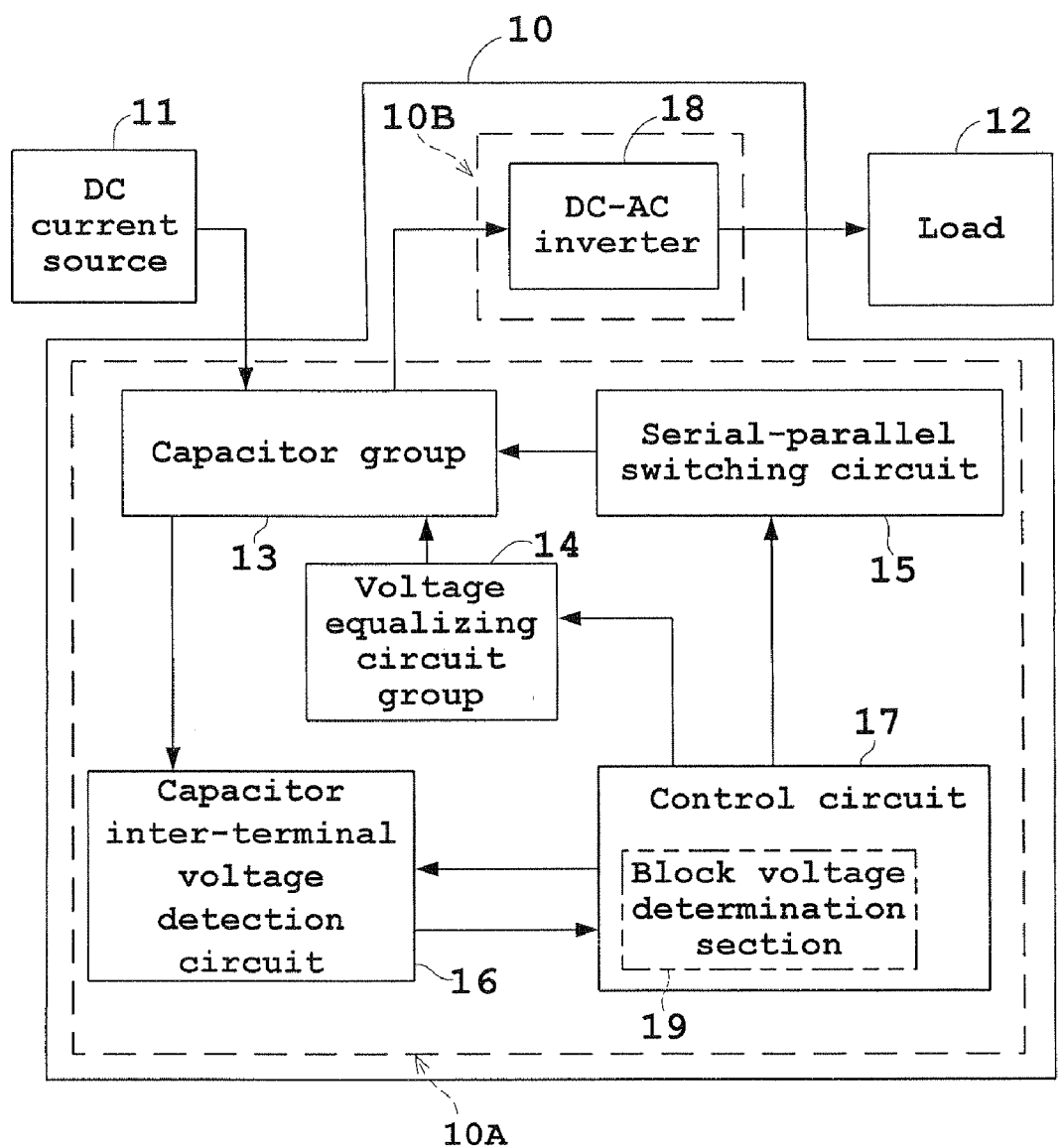
FIG. 6 is a block diagram showing an embodiment of an electric power storage system according to the present invention.

Embodiments of the present invention will be described below with reference to the drawings. FIG. 6 is a block diagram showing an embodiment of an electric power storage system using a capacitor (an electric double layer capacitor, for example) according to the present invention.

The electric power storage system of the present embodiment includes an electric power storage system body 10. The electric power storage system body 10 accumulates a DC electric power supplied from a DC current source 11, converts the accumulated electric power into an AC electric power, and supplies the AC electric power to a load 12.

The DC current source 11 being an external device is constituted of, for example, a solar cell, a wind power generator, an engine generator or the like.

The electric power storage system body 10 is roughly divided into an power storage unit 10A and a power inverter 10B which converts the DC electric power accumulated in the power storage unit 10A into an AC electric power.

Firstly the power storage unit 10A will be described. The power storage unit 10A includes: a capacitor group 13 having a circuit configuration having connected in series a number n (n being a natural number equal to or larger than two) of circuit blocks each having a plurality of electric double layer capacitors (EDLC) being a capacitor; a voltage equalizing circuit (also called a parallel monitor circuit) group 14 connected to the capacitor group 13; a serial-parallel switching circuit 15 which switches the state of two capacitors between parallel connection and serial connection for each circuit block of the capacitor group 13; a capacitor inter-terminal voltage detection circuit 16 which detects an inter-terminal voltage of each EDLC of the capacitor group 13; and a control circuit 17 which detects an output voltage of the capacitor group 13 and controls the serial-parallel switching circuit 15 according to the detected voltage value.

The capacitor group 13 will be described with reference to FIG. 7. FIG. 7 is a circuit diagram showing a configuration of the capacitor group 13 and serial-parallel switching circuit 15. Particularly, FIG. 7A shows a state in which the EDLCs of all the circuit blocks are connected in parallel. FIG. 7B shows a state in which the EDLCs of the first-stage circuit block are connected in series and the EDLCs of the other circuit blocks are connected in parallel. FIG. 7C shows a state in which the EDLCs of the first-stage and second-stage circuit blocks are connected in series and the EDLCs of the other circuit blocks are connected in parallel. FIG. 7D shows a state in which the EDLCs of all the circuit blocks are connected in series.

As shown in FIG. 7, the capacitor group 13 has a circuit configuration having connected in series a number n (n being a natural number equal to or larger than two) of circuit blocks each including two EDLCs, for example, having a capacitance of 3000 [F] and a withstand voltage of 2.3 [V]. The capacitor group 13 corresponds to the power storage means in the present invention.

The serial-parallel switching circuit 15 includes a switch 24 for switching the state of the two capacitors of each circuit block of the capacitor group 13 between parallel connection and serial connection. The serial-parallel switching circuit 15 corresponds to the serial-parallel switching means in the present invention.

The capacitor inter-terminal voltage detection circuit 16 serves to detect an inter-terminal voltage of each EDLC of the capacitor group 13 shown in FIG. 7. The capacitor inter-terminal voltage detection circuit 16 corresponds to the inter-terminal voltage detection means in the present invention.

As shown in FIG. 6, the control circuit 17 includes a block voltage determination section 19 which determines for each circuit block, a block voltage being a voltage of the circuit block of the capacitor group 13 based on the inter-terminal voltage of each EDLC of the capacitor group 13 detected by the capacitor inter-terminal voltage detection circuit 16. The block voltage determination section 19 corresponds to the block voltage determination means in the present invention.

When the capacitor group 13 is charged, the control circuit 17 performs: a first process of controlling the serial-parallel switching circuit 15 to switch the connection of the two EDLCs of each circuit block of the capacitor group 13 to a serial connection at the beginning of charging the capacitor group 13; a second process of controlling the serial-parallel switching circuit 15 to switch the connection of the two EDLCs of j circuit blocks (j is a natural number up to n indicating the number of times that an input voltage reaches the maximum input voltage during one charging process) to a parallel connection in order of higher block voltage determined by the block voltage determination section 19 at the time when the output voltage of the capacitor group 13 reaches the maximum input voltage of a DC-AC inverter 18; and a third process of controlling the serial-parallel switching circuit 15 to switch the connection of the two EDLCs of a number j of circuit blocks to a parallel connection in order of higher block voltage determined by the block voltage determination section 19, also up to the time when the output voltage of the capacitor group 13 reaches again the maximum input voltage of the DC-AC inverter 18.

The expression "at the beginning of charging the capacitor group 13" designates a point of time when charges are scarcely accumulated in each EDLC within the capacitor group 13. However, the expression also designates a point of time when charges are not at all accumulated in each EDLC within the capacitor group 13, or a point of time when charges are accumulated in each EDLC within the capacitor group 13 only to the extent that the minimum input voltage of the DC-AC inverter 18 is not reached.

Further, when the capacitor group 13 is discharged, the control circuit 17 performs: a fourth process of controlling the serial-parallel switching circuit 15 to switch the connection of the two EDLCs of each circuit block of the capacitor group 13 to a parallel connection at the beginning of discharging the capacitor group 13; a fifth process of controlling the serial-parallel switching circuit 15 to switch the connection of the two EDLCs of k circuit blocks (k is a natural number up to n indicating the number of times that an input voltage reaches the minimum input voltage during one discharging process n) to a serial connection in order of higher block voltage determined by the block voltage determination section 19 at the time when the output voltage of the power storage means reaches the minimum input voltage of the DC-AC inverter 18; and a sixth process of controlling the serial-parallel switching circuit 15 to switch the connection of the two EDLCs of a number k of circuit blocks to a serial connection in order of higher block voltage determined by the block voltage determination section 19, also up to the time when the output voltage of the capacitor group 13 reaches again the minimum input voltage of the DC-AC inverter 18.

The expression "at the beginning of discharging the capacitor group 13" designates a point of time when all the EDLCs within the capacitor group 13 are charged to approximately full capacity. However, the expression also designates a point of time when all the EDLCs within the capacitor group 13 are charged to full capacity, or a point of time when charges are accumulated in each EDLC within the capacitor group 13 to the extent that the minimum input voltage of the DC-AC inverter 18 is exceeded when the EDLCs of all the circuit blocks are connected in parallel.

The control circuit 17 performs the third and sixth processes described above each time a predetermined interval time (5 seconds, for example) passes. The interval time may be a predetermined time other than 5 seconds. Also, the interval time is preferably set to a predetermined value in view of the capacitance of the capacitor (EDLC).

Also, in order to equalize the capacitor inter-terminal voltage of each circuit block, when the capacitor group 13 is charged/discharged, the control circuit 17 performs a seventh process of setting as a reference value, a lowest EDLC inter-terminal voltage from among the inter-terminal voltages of the EDLCs of each circuit block detected by the capacitor inter-terminal voltage detection circuit 16, and controlling the voltage equalizing circuit group 14 to cause in response that the inter-terminal voltage of the other EDLCs within this same circuit block exceeds a voltage value obtained by adding a permitted value to the minimum inter-terminal voltage value, the EDLC having this same voltage value to be forcibly discharged.

The control circuit 17 performs the seventh processes described above each time a predetermined interval time (5 seconds, for example) passes. The interval time may be a predetermined time other than 5 seconds. Also, the interval time is preferably set to a predetermined value in view of the capacitance of the capacitor (EDLC). The control circuit 17 corresponds to the control means in the present invention.

As shown in FIG. 7, between each circuit block of the capacitor group 13, there are provided switches 23 for selecting conduction or non-conduction. The control circuit 17 turns off the switch positioned between the circuit blocks having EDLCs connected in parallel, selected from among the switches 23.

As shown in FIG. 8, the voltage equalizing circuit group (parallel monitor circuit) 14 is constituted of a plurality of voltage equalizing circuits 14A, 14B . . . each connected in parallel with each electric double layer capacitor (EDLC) C1, C2 . . . constituting the capacitor group 13. Each of the voltage equalizing circuit 14A, 14B . . . has the same configuration. Thus the voltage equalizing circuit will be described below by taking as an example, the voltage equalizing circuit 14A.

The voltage equalizing circuit 14A is constituted of a discharging path for bypassing both the terminals of a capacitor C1, having connected in series a resistor 20 and a field-effect transistor (FET) 21, and a discharge control circuit 22 which controls the opening and closing of the discharging path. The discharge control circuit 22 monitors the terminal voltage of the capacitor C1, and in response that the terminal voltage exceeds a predetermined voltage (the withstand voltage of the electric double layer capacitor), supplies a control signal to the FET 21 to change it to a conduction state, whereby the discharging path is changed to a closed state to cause the capacitor C1 to be forcibly discharged. Each of the voltage equalizing circuits 14A, 14B . . . prevents the corresponding electric double layer capacitors C1, C2 . . . from being overcharged. Each of the voltage equalizing circuits 14A, 14B . . . corresponds to the overcharge prevention means in the present invention.

The control circuit 17 may perform the function of the discharge control circuit 22. Specifically, when the terminal voltage of the capacitor C1 detected by the capacitor inter-terminal voltage detection circuit 16 exceeds a predetermined voltage (the withstand voltage of the electric double layer capacitor), the control circuit 17 supplies a control signal to the FET 21 to change it to a conduction state, whereby the discharging path is changed to a closed state to cause the capacitor C1 to be forcibly discharged.

Also, the function of the voltage equalizing circuits 14A, 14B . . . at the time of charging operation will be described. It is found that there is actually a variation in capacitance even between EDLCs having the same rated capacitance, and thus the charging time differs from EDLC to EDLC. Accordingly, there may be a case where even when one EDLC is charged to full capacity, the other EDLC is still not charged to full capacity. Thus, as described above, when a voltage equalizing circuit is provided for all the EDLCs, all the EDLCs can be charged to full capacity without completing the charging of all the EDLCs at the time when one EDLC is charged to full capacity.

The configuration of the power inverter 10B will now be described. As shown in FIG. 6, the power inverter 10B includes the direct current-to-alternate current (DC-AC) inverter 18. The DC-AC inverter 18 converts a DC input voltage to an AC output voltage and supplies it to the load 12. The DC-AC inverter 18 corresponds to the DC-AC conversion means in the present invention.

Figure 9A:
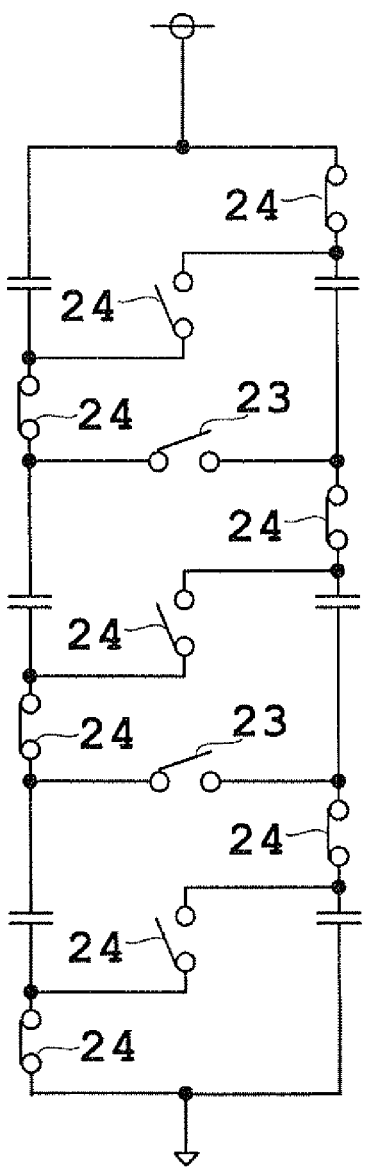
FIG. 9 is a view showing an example of the electric power storage system having the capacitor groups belonging to three circuit blocks according to the embodiment 1.
Figure 9B:
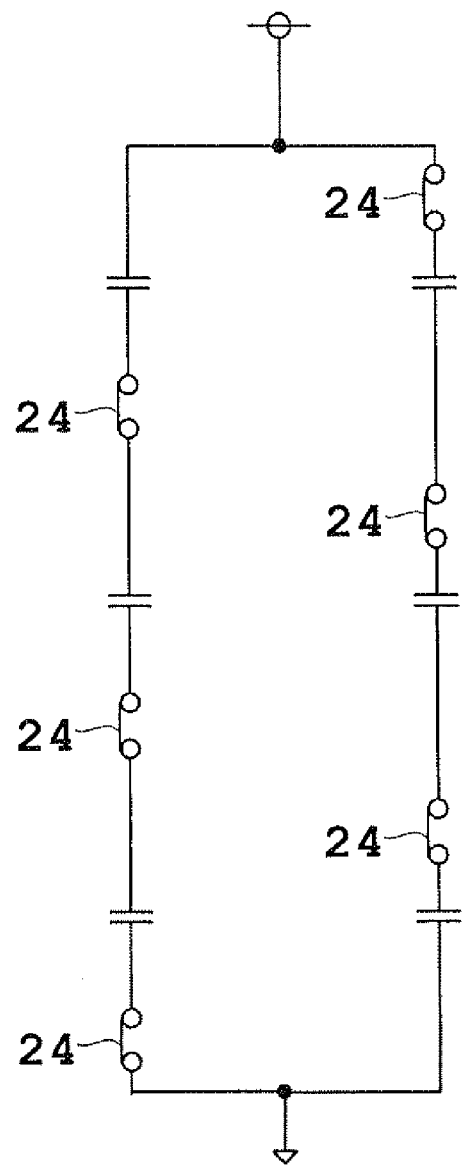

In order to simplify the following description, an electric power storage system including the capacitor group 13 constituted of three circuit blocks (sometimes referred to as "three blocks" for short) as shown in FIG. 9A is taken as an example. Specifically, a description will be given by taking as an example, a configuration in which each switch 24 of the capacitor group 13 and the serial-parallel switching circuit 15 constitutes three circuit blocks. In the following description, only the switches 23 and 24 being in a closed state are illustrated, and thus FIG. 9A is represented as FIG. 9B.

Figure 10C:
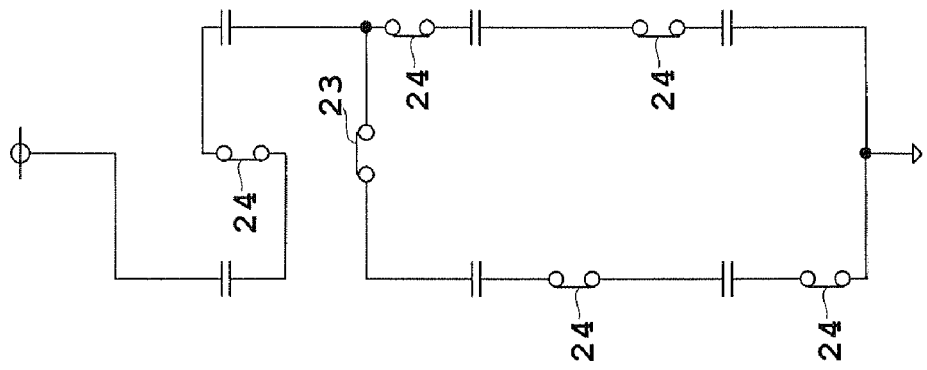
FIG. 10 is a view for explaining a connection pattern in which only the EDLCs belonging to one circuit block are connected in series.
Figure 10B:
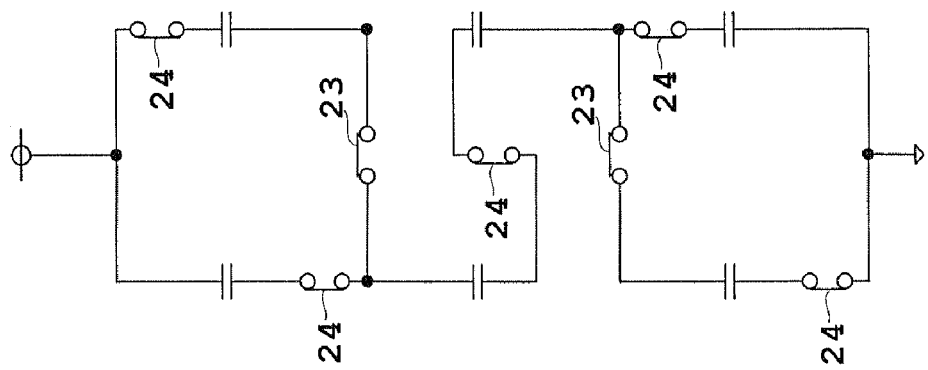
Figure 10A:
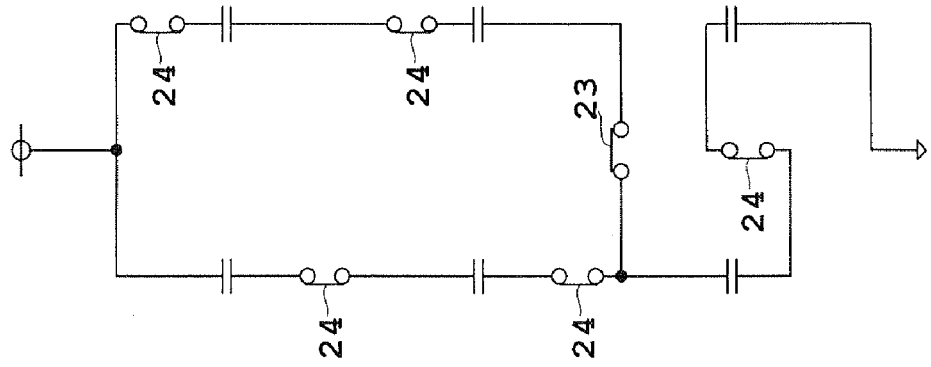

In the case of the circuit configuration of FIG. 9A, a pattern having connected in series the EDLCs of only one circuit block and having connected in parallel the EDLCs of the two circuit blocks includes three connection patterns as shown in FIG. 10.

Figure 11:
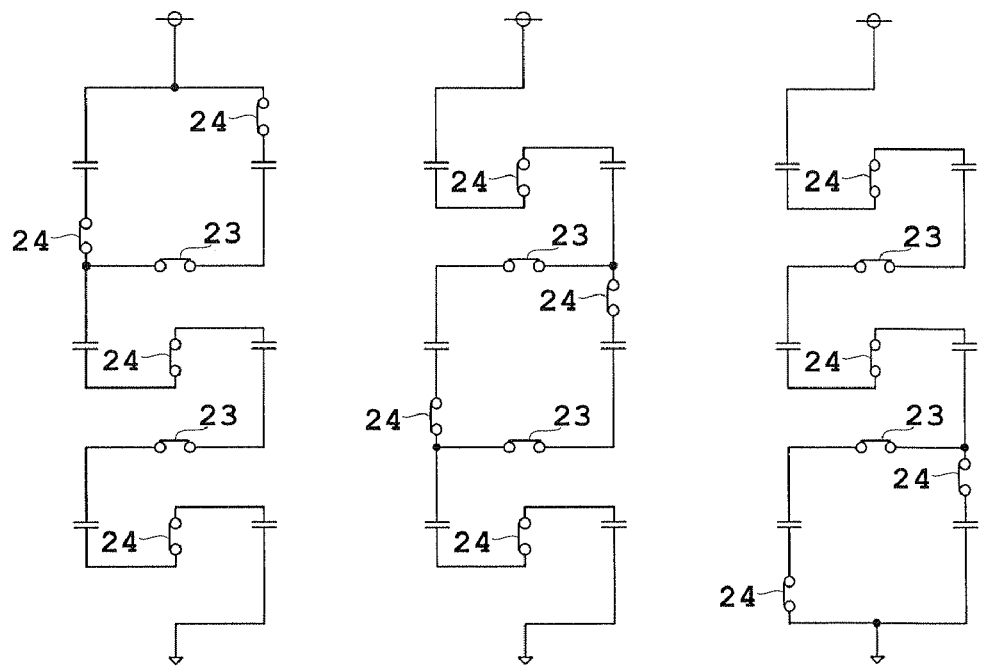
FIG. 11 is a view for explaining a connection pattern in which only the EDLCs belonging to one circuit block are connected in parallel.
Figure 12:
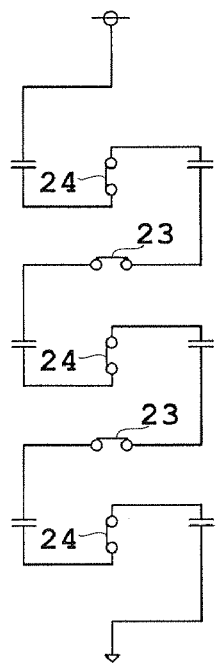
FIG. 12 is a view for explaining a connection pattern in which the EDLCs belonging to all the circuit blocks are connected in series.

Also, as shown in FIG. 11, a pattern having connected in series the EDLCs of two circuit blocks and having connected in parallel the EDLCs of only one circuit block includes three kinds. Further, if a connection pattern of FIG. 12 having connected in series all the EDLCs and the above described pattern of FIG. 9 having connected in parallel the EDLCs of all the circuit blocks are added, then there are eight connection patterns ($=2^3$) in total. In the device according to the present embodiment, a switchover can be made to an optimum connection pattern selected from among the eight kinds of connection patterns.

Figure 13A:
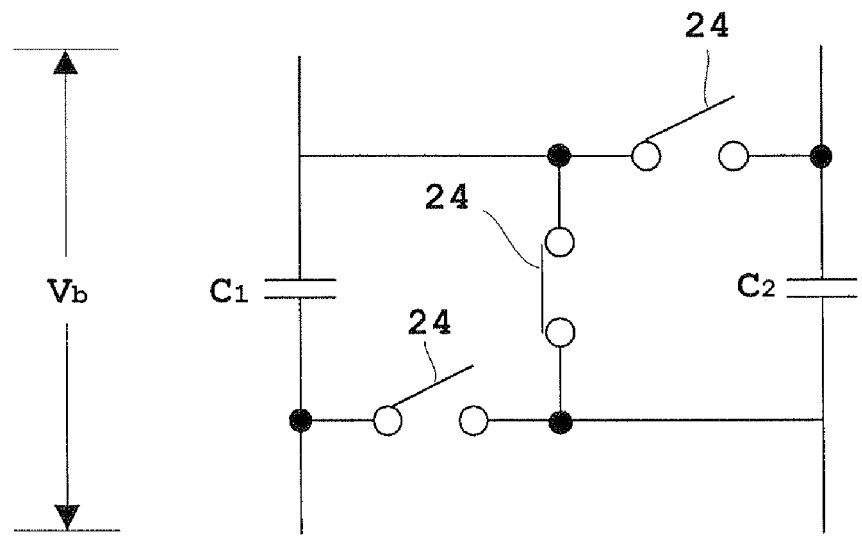
FIG. 13A is a view for explaining block voltage when the EDLCs within a circuit block are connected in series.
Figure 13B:
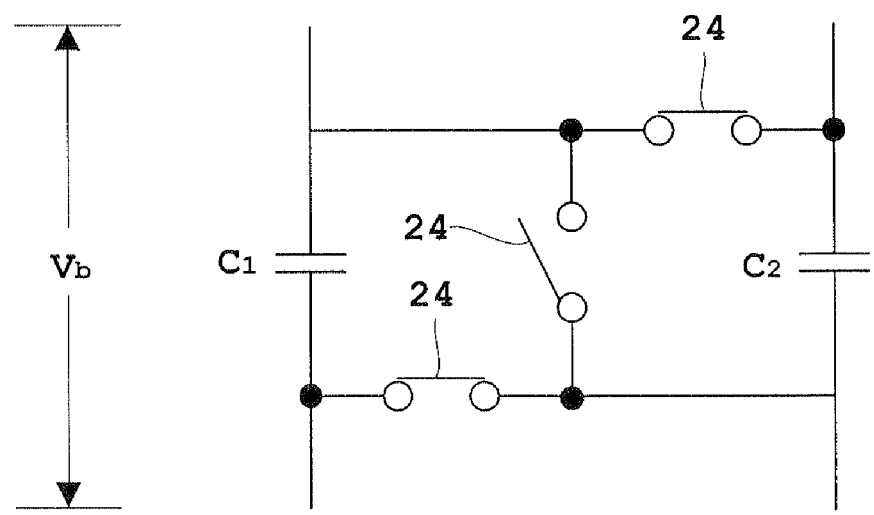
FIG. 13B is a view for explaining block voltage when the EDLCs within a circuit block are connected in parallel.

In the following description, when the EDLCs within one circuit block are connected in series as shown in FIG. 13A, the total voltage $V_b$ of the inter-terminal voltages of each EDLC is referred to as "block voltage"; when the EDLCs within one circuit block are connected in parallel as shown in FIG. 13B, the average voltage $V_b$ between the inter-terminal voltages of each EDLC is referred to as "block voltage".

When n stages of circuit blocks are connected as described above, the total number of EDLC connection patterns is $2^n$; as the number of circuit blocks increases, the number of patterns also increases. As the number of connection patterns increases, the number of choices increases. Thus, when an optimum connection pattern is selected from among many connection patterns, it becomes possible to switch the EDLCs within a block having EDLCs that are connected in parallel back to a serial connection, and then to switch the EDLCs within the other circuit blocks to a parallel connection again, whereby a variation in inter-terminal voltage of all the capacitors (EDLCs) can be minimized.

Shown in FIG. 14 is an exemplary connection pattern in which n stages of circuit blocks are connected. FIG. 14A shows an example in which all the EDLCs are connected in series, FIG. 14B shows an example in which only the EDLCs of one circuit block are connected in parallel, and FIG. 14C shows an example in which only the EDLCs of two circuit blocks are connected in parallel.

According to the conventional circuit system shown in FIG. 1, in a block having EDLCs that are switched from serial connection to a parallel connection, for example, at the time of charging, the block voltage immediately after the change may become extremely low compared to when being connected in series. Contrarily, in a block having EDLCs that are switched from parallel connection to a serial connection at the time of discharging, the block voltage immediately after the change, may become extremely high compared to when being connected in parallel, thus increasing the fluctuation range of the output voltage of the electric power storage system.

However, according to the present system, the inter-terminal voltage of each capacitor (EDLC) is monitored by the capacitor inter-terminal voltage detection circuit 16 at a given interval, and from among many connection patterns, a circuit block having a highest block voltage is switched to a parallel connection at the time of charging, and a circuit block having a highest block voltage is switched to a serial connection at the time of discharging. By repeating this operation, a variation between each block voltage can be suppressed, and further a variation in inter-terminal voltage of all the capacitors (EDLCs) can be minimized, whereby the voltage equalization loss by the voltage equalizing circuit group (parallel monitor circuit) 14 can be suppressed.

The serial-parallel switching control of a circuit block by the control circuit 17 will be described more in detail.

[Serial-Parallel Switching Control of a Circuit Block]

According to the conventional system, when the output voltage of the electric power storage system approaches the lower limit or the upper limit of an inverter input voltage range, the serial-parallel switching is performed and for example, in a charging process, a block once switched to a parallel connection is never returned to a serial connection. In contrast, according to the present system, by virtue of provision of the control circuit 17, many serial-parallel connection patterns can be realized, and thus an optimum serial-parallel switching of the EDLCs of the circuit blocks can be performed. Specifically, in a charging process, the EDLCs are switched to a parallel connection in order of highest block voltage circuit block, and at the time of subsequent switching, a selection of an optimum connection pattern (serial-parallel pattern) is made to perform switching, including returning to a parallel connection the EDLCs of a circuit block in which EDLCs are connected in series at that time. Similarly, at the time of discharging, the EDLCs are switched to a serial connection in order of highest block voltage circuit block, and at the time of subsequent switching, a selection of an optimum connection pattern is made to perform switching, including returning to a parallel connection the EDLCs of a circuit block in which EDLCs are connected in series at that time.

To explain a little more in detail, in the present electric power storage system, the inter-terminal voltage of all the capacitors (EDLCs) is measured at a given interval (5 seconds, for example) based on an instruction from the control circuit 17, whereby an optimum serial-parallel switching is performed. Instead of setting an interval, the inter-terminal voltage of all the capacitors may continue to be measured at all times.

In the switching control in a charging process, for example, when the charge of all the EDLCs is "0", charging is initiated starting with a pattern in which all the EDLCs are connected in series. After charging is performed to some extent, when the output voltage of the electric power storage system approaches the upper limit (15 [v], for example) of the input voltage range of the DC-AC inverter 18, i.e., approaches 14.9 [v], the EDLCs of one block having a highest block voltage are switched to a parallel connection, and then charging continues to be performed. After that, however, the inter-terminal voltage of all the capacitors (EDLCs) is measured at a given interval (5 seconds, for example), charges are uniformly accumulated in each circuit block, and a most appropriate circuit block whose EDLCs are to be switched to a parallel connection is selected so that a variation in block voltage is minimized. In this way, the serial-parallel switching is performed.

After charges are uniformly accumulated in each circuit block and charging is further continued, when the output voltage of the electric power storage system approaches again the upper limit (15 [v], for example) of the input voltage range of the DC-AC inverter 18, i.e., approaches 14.9 [v], because it is now not sufficient to switch the EDLCs of only one circuit block to a parallel connection, the EDLCs of two circuit blocks are subsequently switched to a parallel connection and charging is continued. In this case, the EDLCs of two circuit blocks having a large block voltage are switched to a parallel connection. Thereafter, while the number of blocks having EDLCs connected in parallel is similarly increased, charging is continued until the EDLCs of all the blocks are switched to a parallel connection.

In a discharging process, for example, when the charge of all the EDLCs is in a fully charged state, discharging is initiated starting with a pattern in which all the EDLCs are connected in parallel. After discharging is performed to some extent, when the output voltage of the electric power storage system approaches the lower limit (10.5 [v], for example) of the input voltage range of the DC-AC inverter 18, i.e., approaches 10.6[v], the EDLCs of one block having a highest block voltage are connected in series, and then discharging is continued.

Discharging continues to be performed. However, the inter-terminal voltage of all the capacitors (EDLCs) is measured at a given interval (5 seconds, for example), and the selection and switching of one circuit block whose EDLCs are to be switched to a serial connection are performed so that the charges of each block are uniformly discharged.

After the charges of all the circuit blocks are uniformly discharged and discharging is further continued, when the output voltage of the electric power storage system approaches again the lower limit (10.5 [v], for example) of the input voltage range of the DC-AC inverter 18, i.e., approaches 10.6 [v], because it is now not sufficient to switch the EDLCs of only one circuit block to a serial connection, the EDLCs of two circuit blocks are subsequently switched to a serial connection and discharging is continued. In this case, the EDLCs of two circuit blocks having a large block voltage are switched to a serial connection. Thereafter, while the number of blocks having EDLCs connected in serial is similarly increased, discharging is continued until the EDLCs of all the blocks are switched to a serial connection.

Figure 15:
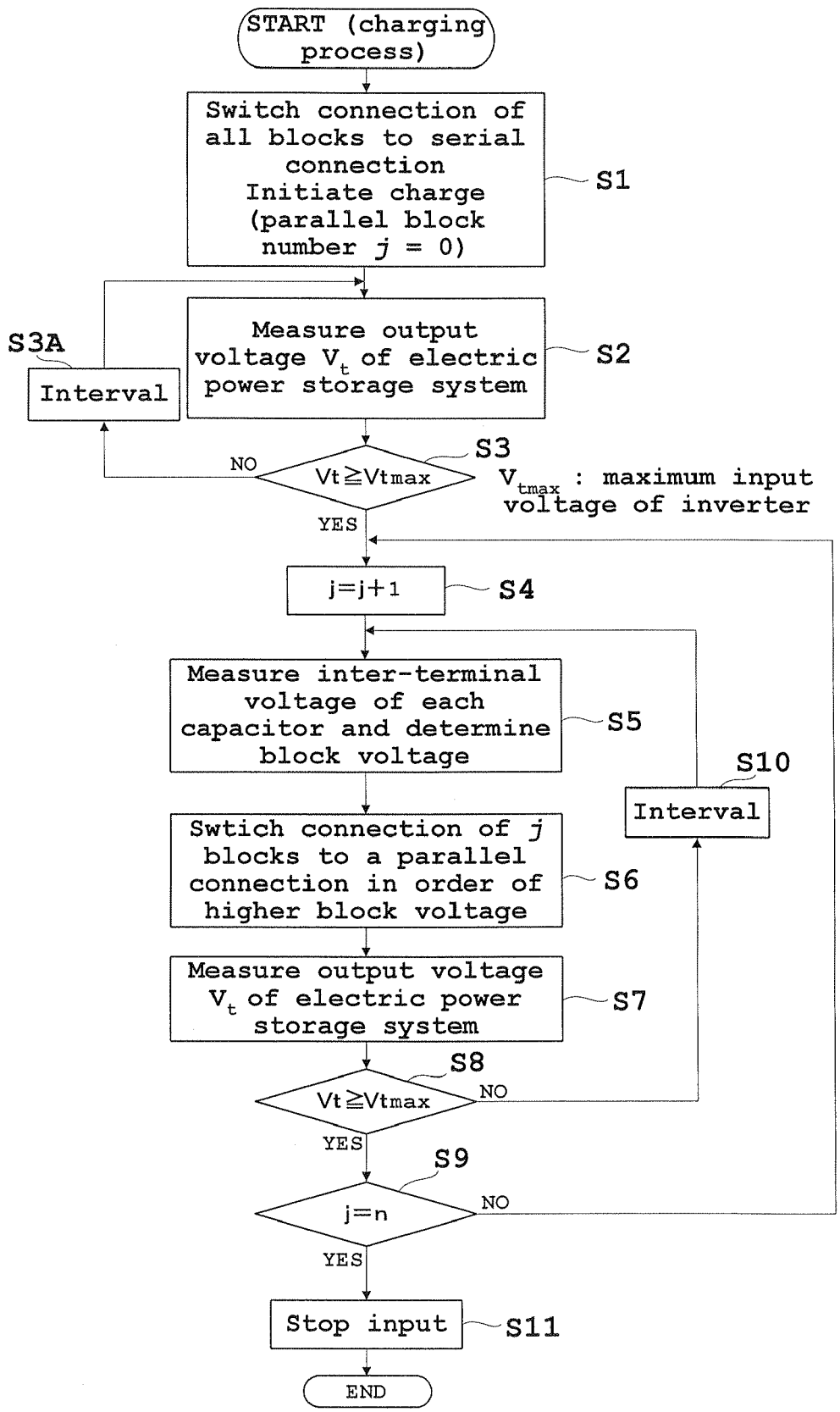
FIG. 15 is a flowchart of serial-parallel switching charge at the time of charging.
Figure 16:
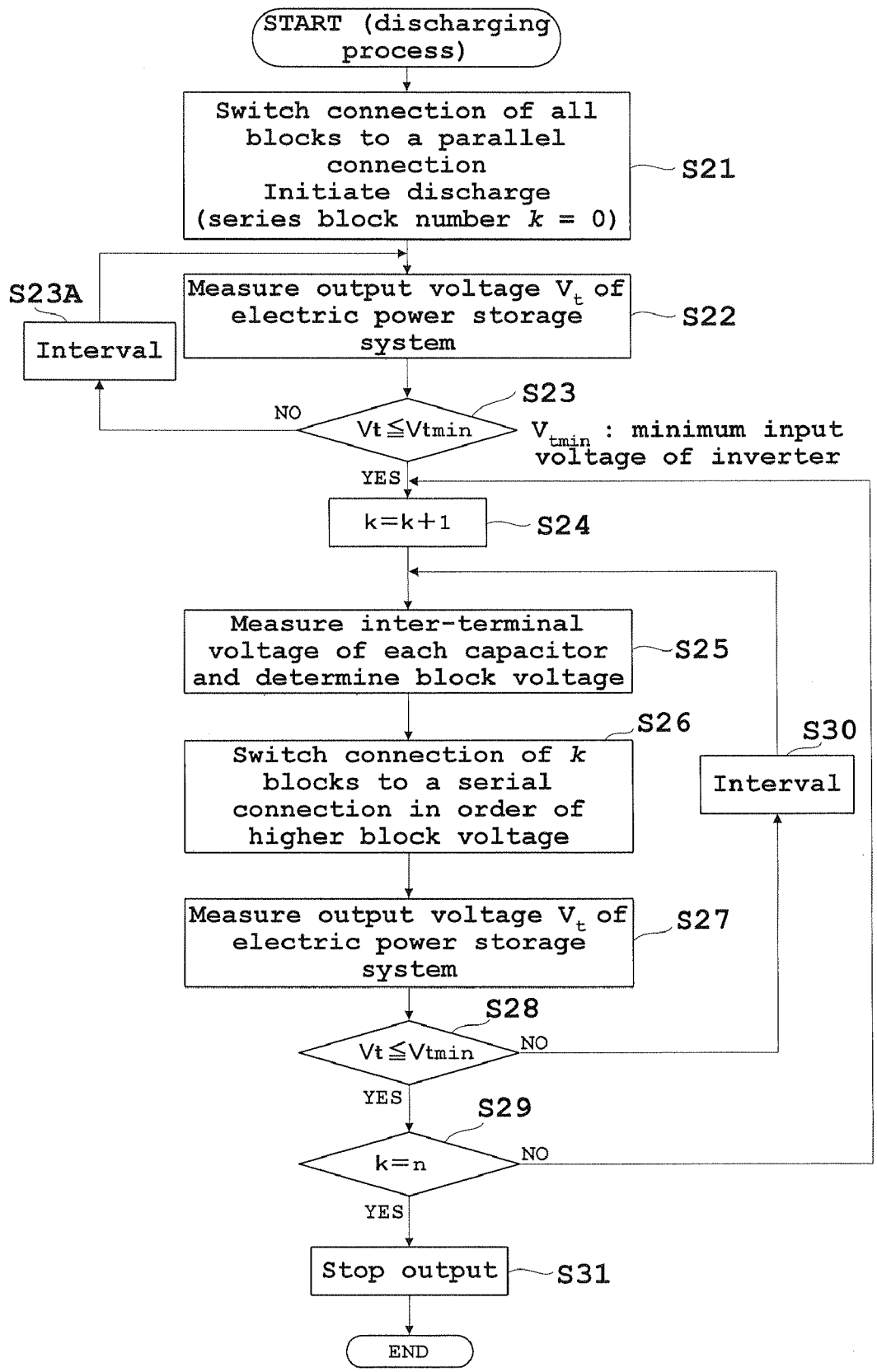
FIG. 16 is a flowchart of serial-parallel switching charge at the time of discharging.

A flowchart of the serial-parallel switching described above at the time of charging is shown in FIG. 15, and a flowchart of the serial-parallel switching at the time of discharging is shown in FIG. 16.

As shown in FIG. 15, in step S1, while the EDLCs of all the blocks of the capacitor group 13 are switched to a serial connection, charging is initiated. Specifically, parallel block number j being the number of circuit blocks having EDLCs connected in parallel is "0". Step S1 corresponds to the first process in the present invention. In step S2, the output voltage $V_t$ of the electric power storage system is measured. In step S3, it is detected whether or not the output voltage $V_t$ of the electric power storage system reaches the maximum input voltage $V_{tmax}$ of the DC-AC inverter 18. If not, the flow proceeds to step S3A. In this step S3A, there is a wait until the interval time (5 seconds, for example) passes, and then the flow returns to step S2. If the output voltage $V_t$ of the electric power storage system reaches the maximum input voltage $V_{tmax}$, the flow proceeds to step S4.

In step S4, "1" is added to parallel block number j. In step S5, the inter-terminal voltage of each capacitor (EDLC) is measured to determine a block voltage. In step S6, the EDLCs of a number j of circuit blocks are switched to a parallel connection in order of higher block voltage. In step S7, the output voltage $V_t$ of the electric power storage system is measured. In step S8, it s detected whether or not the output voltage $V_t$ of the electric power storage system reaches the maximum input voltage $V_{tmax}$ of the DC-AC inverter 18. If not, the flow proceeds to step S10. In this step S10, there is a wait until the interval time (5 seconds, for example) passes, and then the flow returns to step S5. If the output voltage $V_t$ of the electric power storage system reaches the maximum input voltage $V_{tmax}$, the flow proceeds to step S9.

In step S9, it is determined whether or not parallel block number j reaches the total number n of circuit blocks. If so, the flow proceeds to step S11; if not, the flow returns to step S4. Steps S3 to S9 correspond to the second process in the present invention, and steps S5 to S8, and S10 correspond to the third process in the present invention.

In step S11, supplying electric current to the capacitor group 13, i.e., the charging of the capacitor group 13 is stopped, and this charging process is terminated.

Discharging process will now be described. As shown in FIG. 16, in step S21, discharging is initiated while the EDLCs of all the blocks of the capacitor group 13 are switched to a parallel connection. Specifically, series block number k being the number of circuit blocks having EDLCs connected in series is "0". Step S21 corresponds to the fourth process in the present invention. In step S22, the output voltage $V_t$ of the electric power storage system is measured. In step S23, it is detected whether or not the output voltage $V_t$ of the electric power storage system reaches the minimum input voltage $V_{tmin}$ of the DC-AC inverter 18. If not, the flow proceeds to step S23A. In this step S23A, there is a wait until the interval time (5 seconds, for example) passes, and then the flow returns to step S22. If the output voltage $V_t$ of the electric power storage system reaches the minimum input voltage $V_{tmin}$, the flow proceeds to step S24.

In step S24, "1" is added to series block number k. In step S25, the inter-terminal voltage of each capacitor (EDLC) is measured to determine a block voltage. In step S26, the EDLCs of a number k of circuit blocks are switched to a serial connection in order of higher block voltage. In step S27, the output voltage $V_t$ of the electric power storage system is measured. In step S28, it s detected whether or not the output voltage $V_t$ of the electric power storage system reaches the minimum input voltage $V_{tmin}$ of the DC-AC inverter 18. If not, the flow proceeds to step S30. In this step S30, there is a wait until the interval time (5 seconds, for example) passes, and then the flow returns to step S25. If the output voltage $V_t$ of the electric power storage system reaches the minimum input voltage $V_{tmin}$, the flow proceeds to step S29.

In step S29, it is determined whether or not parallel block number k reaches the total number n of circuit blocks. If so, the flow proceeds to step S31; if not, the flow returns to step S24. Steps S23 to S29 correspond to the fifth process in the present invention, and steps S25 to S28, and S30 correspond to the sixth process in the present invention.

In step S31, the output from the capacitor group 13, i.e., the discharging of the capacitor group 13 is stopped, and this discharging process is terminated.

In a case where charging and discharging are repeated at random, when an input current from the DC current source 11 to the electric power storage system and an output current from the electric power storage system to the DC-AC inverter 18 are detected at all times to determine a switchover between the charging mode and discharging mode, charging and discharging can be optimally performed even with a configuration in which the charging and discharging are repeated at random. A flowchart of the serial-parallel switching when charging and discharging are repeated at random will be described with reference to FIG. 17.

Figure 17:
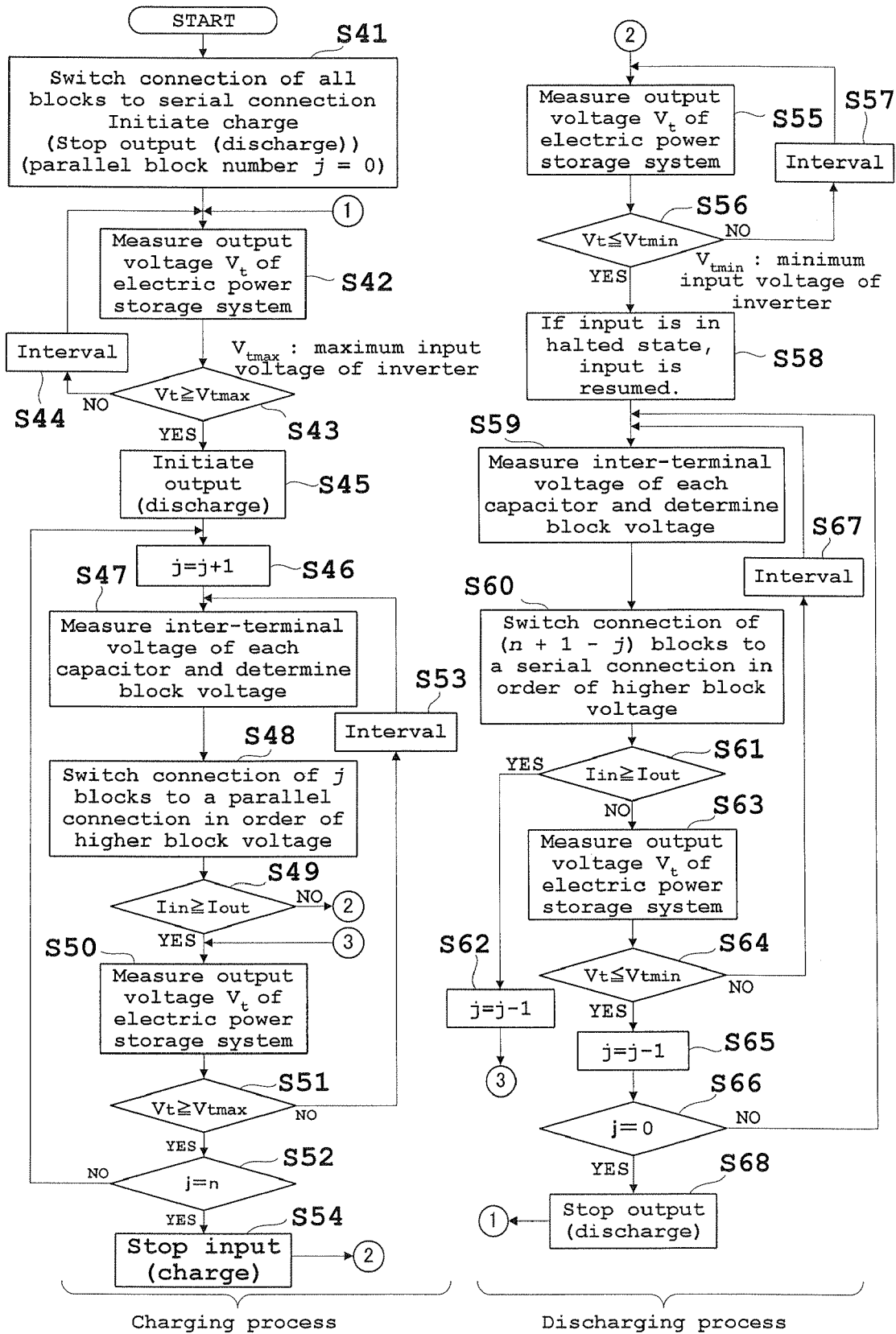
FIG. 17 is a flowchart of serial-parallel switching charge when charging and discharging are repeated at random.

As shown in FIG. 17, in step S41, charging is initiated while the EDLCs of all the blocks of the capacitor group 13 are switched to serial connection. Specifically, the output (discharging) of the electric power storage system is in a halted state, and parallel block number j being the number of circuit blocks having EDLCs connected in parallel is "0". Step S41 corresponds to the first process in the present invention. In step S42, the output voltage $V_t$ of the electric power storage system is measured. In step S43, it is detected whether or not the output voltage $V_t$ of the electric power storage system reaches the maximum input voltage $V_{tmax}$ of the DC-AC inverter 18. If not, the flow proceeds to step S44. In step this S44, there is a wait until the interval time (5 seconds, for example) passes, and then the flow returns to step S42. If the output voltage $V_t$ of the electric power storage system reaches the maximum input voltage $V_{tmax}$, the flow proceeds to step S44.

In step S45, the output (discharging) of the electric power storage system is initiated. In step S46, "1" is added to parallel block number j. In step S47, the inter-terminal voltage of each capacitor (EDLC) is measured to determine a block voltage. In step S48, the EDLCs of a number j of circuit blocks are switched to a parallel connection in order of higher block voltage. In step S49, if the input current $I_{in}$ from the DC current source 11 to the electric power storage system is equal to or larger than the output current $I_{out}$ from the electric power storage system to the DC-AC inverter 18, the flow proceeds to step S50. If not, the flow proceeds to step S55. In step S50, the output voltage $V_t$ of the electric power storage system is measured. In step S51, it is detected whether or not the output voltage $V_t$ of the electric power storage system reaches the maximum input voltage $V_{tmax}$ of the DC-AC inverter 18. If not, the flow proceeds to step S53. In this step S53, there is a wait until the interval time (5 seconds, for example) passes, and the flow returns to step S47. If the output voltage $V_t$ of the electric power storage system reaches the maximum input voltage $V_{tmax}$, then the flow proceeds to step S52.

In step S52, it is determined whether or not parallel block number j reaches the total number n of circuit blocks. If so, the flow proceeds to step S54. If not, the flow returns to step S46. In step S54, supplying current to the capacitor group 13, i.e., the charging of the capacitor group 13 is stopped (the input is stopped). Steps S43 to S48, and steps S50 to S52 correspond to the second process in the present invention, and steps S47, S48, S50, S51 and S53 correspond to the third process in the present invention. Step S54 corresponds to the fourth process in the present invention.

In step S55, the output voltage $V_t$ of the electric power storage system is measured. In step S56, if the output voltage $V_t$ of the electric power storage system does not reach the minimum input voltage $V_{tmin}$ of the DC-AC inverter 18, the flow proceeds to step S57. In this step S57, there is a wait until the interval time (5 seconds, for example) passes, and the flow returns to step S55. If the output voltage $V_t$ of the electric power storage system reaches the minimum input voltage $V_{tmin}$, then the flow proceeds to step S58.

In step S58, if the charging of the capacitor group 13 is in a halted state (the input to the electric power storage system is in a halted state), the charging of the capacitor group 13 is resumed (the input to the electric power storage system is resumed). In step S59, the inter-terminal voltage of each capacitor (EDLC) is measured to determine a block voltage. In this step S60, the EDLCs of a number (n+1−j) of circuit blocks are switched to serial connection in order of higher block voltage.

In step S61, if the input current $I_{in}$ from the DC current source 11 to the electric power storage system is equal to or larger than the output current $I_{out}$ from the electric power storage system to the DC-AC inverter 18, the flow proceeds to step S62. If the input current $I_{in}$ is not equal to or larger than the output current $I_{out}$, then the flow proceeds to step S63. In step S63, the output voltage $V_t$ of the electric power storage system is measured. In step S62, "1" is subtracted from parallel block number j. Then the flow proceeds to step S50.

In step S64, it is detected whether or not the output voltage $V_t$ of the electric power storage system reaches the minimum input voltage $V_{tmin}$ of the DC-AC inverter 18. If not, the flow proceeds to step S67. In this step S67, there is a wait until the interval time (5 seconds, for example) passes, and then the flow returns to step S59. If the output voltage $V_t$ of the electric power storage system reaches the minimum input voltage $V_{tmin}$, the flow proceeds to step S65. In step S65, "1" is subtracted from parallel block number j. Then the flow proceeds to step S66.

In step S66, it is determined whether or not parallel block number j is "0". If so, the flow proceeds to step S68; if not, the flow returns to step S59. Steps S56, S59, S60, and S63 to S66 correspond to the fifth process, and steps S59, S60, S63, S64 and S67 correspond to the sixth process in the present invention.

In step S68, the discharging of the capacitor group 13 is stopped (the output of the electric power storage system is stopped), and the flow returns to step S42.

The constant correction of the capacitor (EDLC) inter-terminal voltage in the electric power storage system according to the present embodiment will be described below.

According to the present system, the control circuit 17 monitors a variation in inter-terminal voltage of each EDLC at a given interval (5 seconds, for example) to control the voltage equalizing circuit group (parallel monitor circuit) 14, whereby a correction is made so that the inter-terminal voltage of each EDLC falls into a given range at all times. Accordingly, the switch 24 can be prevented from being broken by the laterally flowing current associated with the serial-parallel switching. Also, before the inter-terminal voltage considerably fluctuates, a correction is made at all times. Thus the voltage equalization loss can be suppressed.

This constant correction, which is an operation for suppressing a variation in capacitor inter-terminal voltage of each circuit block, is made for each circuit block. Specifically, a lowest EDLC inter-terminal voltage $V_{cmin}$ is set as a reference value from among the inter-terminal voltages of the EDLCs of each circuit block, and when the inter-terminal voltage of the other EDLCs of that circuit block is higher by a preliminarily set correction value than this $V_{cmin}$, this same EDLC is forcibly discharged. Specifically, in a case where a circuit block is constituted of two capacitors (EDLCs), when the inter-terminal voltage of the capacitor having a higher inter-terminal voltage is equal to or higher than a voltage value obtained by adding a permitted value X to the voltage value of the capacitor having a lower inter-terminal voltage, the capacitor having a higher inter-terminal voltage is forcibly discharged, whereby the inter-terminal voltages of the two capacitors are equalized.

When the capacitors (EDLCs) shown in FIG. 7 etc. each include a plurality of capacitors connected in serial-parallel, the forcible discharge is performed under a condition expressed as the following formula (1), where reference character N denotes the total number of capacitors within the circuit block, reference character i denotes capacitor number within the block, reference character $V_{ci}$ denotes an inter-terminal voltage of an EDLC having capacitor number i, and reference character X denotes a permitted value. Capacitor i which meets this condition is forcibly discharged.

$$V_{ci} > V_{cmin} + X \quad (1)$$

$$V_{cmin} = \min(V_{c1}, V_{c2}, \ldots, V_{cN})$$

A comparison between the conventional system and the present system will now be made. In order to make a comparison between the conventional system and the present system, an electric power storage system using twelve capacitors (EDLCs) was studied. Under a condition where the withstand voltage of each capacitor (EDLC) is 2.3 [V], and only one EDLC of the first block from among the twelve capacitors has a capacitor error of 10%, i.e., the capacitance of the eleven capacitors (EDLCs) is 3000 [F] and the capacitance of the one capacitor (EDLC) is 2700 [F], the charging/discharging process of the electric power storage system was simulated.

Figure 2A:
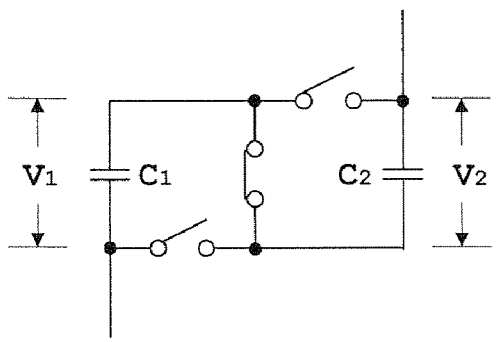
FIG. 2 is a circuit diagram for explaining laterally flowing current.
Figure 2B:
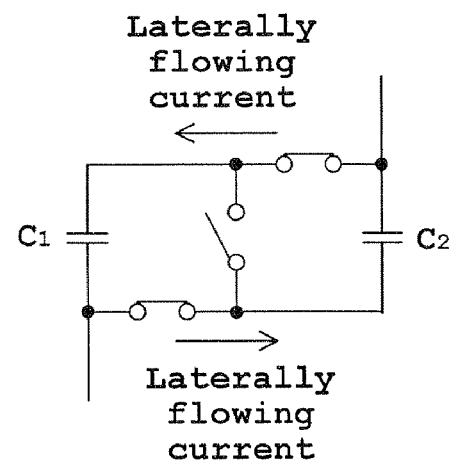
Figure 3:
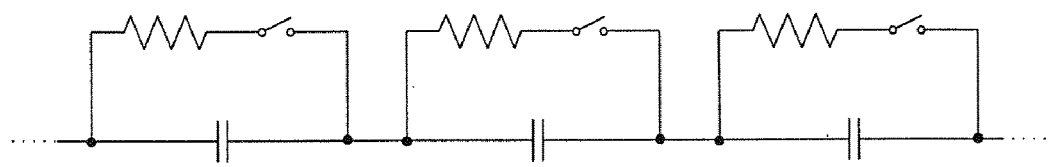
FIG. 3 is a configuration diagram of a conventional voltage equalizing circuit.
Figure 4:
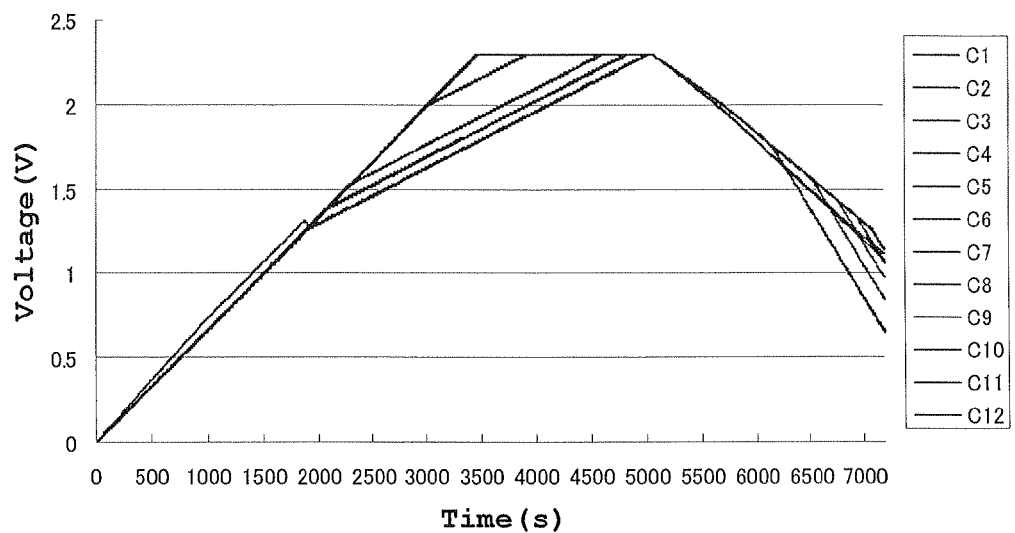
FIG. 4 is a view showing a simulation result of charging and discharging temporal change with respect to each conventional capacitor.
Figure 5:
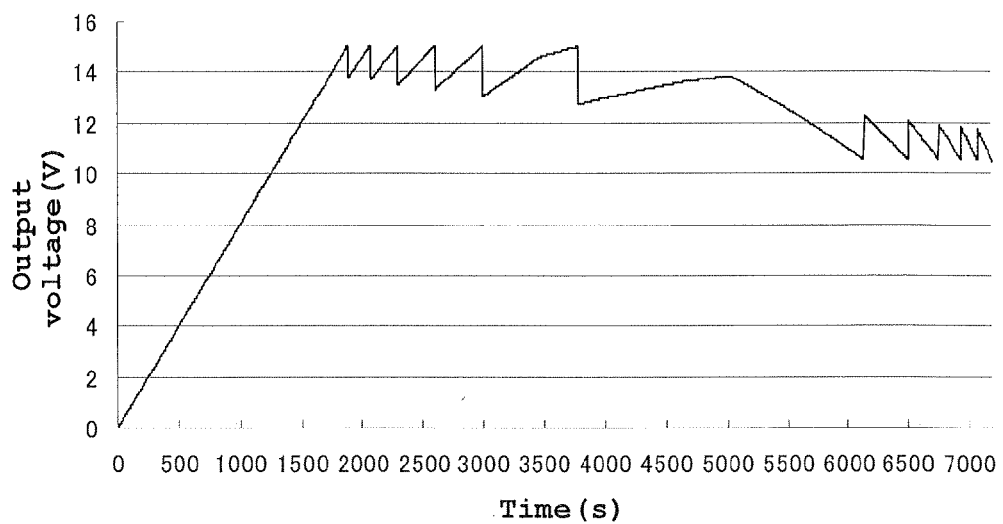
FIG. 5 is a view showing a simulation result of charging and discharging temporal change with respect to the output voltage of a conventional electric power storage system.
Figure 18:
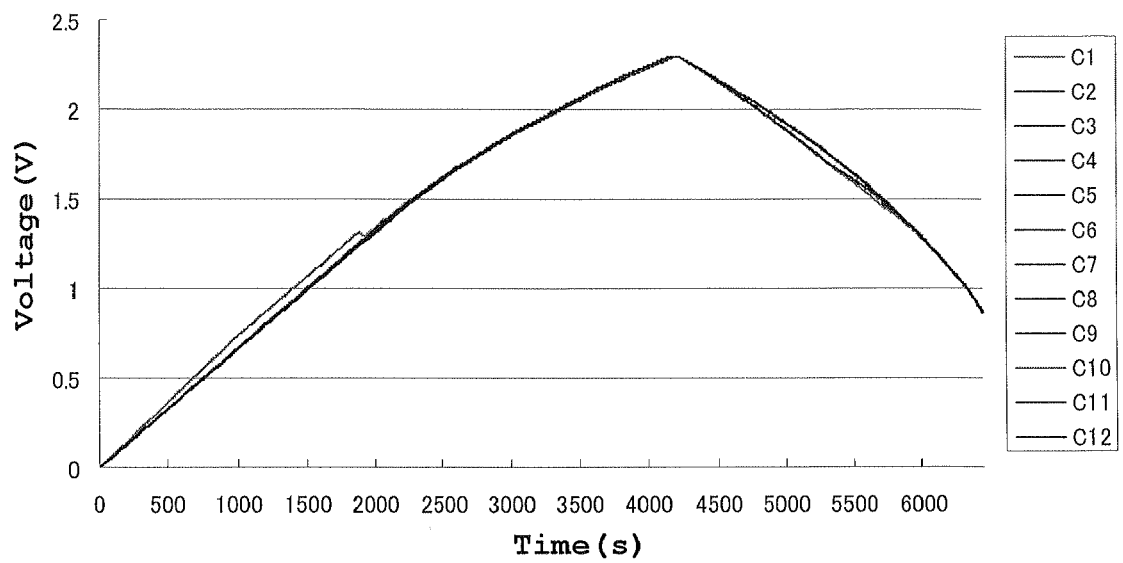
FIG. 18 is a characteristic chart showing the temporal change of the inter-terminal voltage of each of the twelve capacitors according to the embodiment 1.
Figure 19:
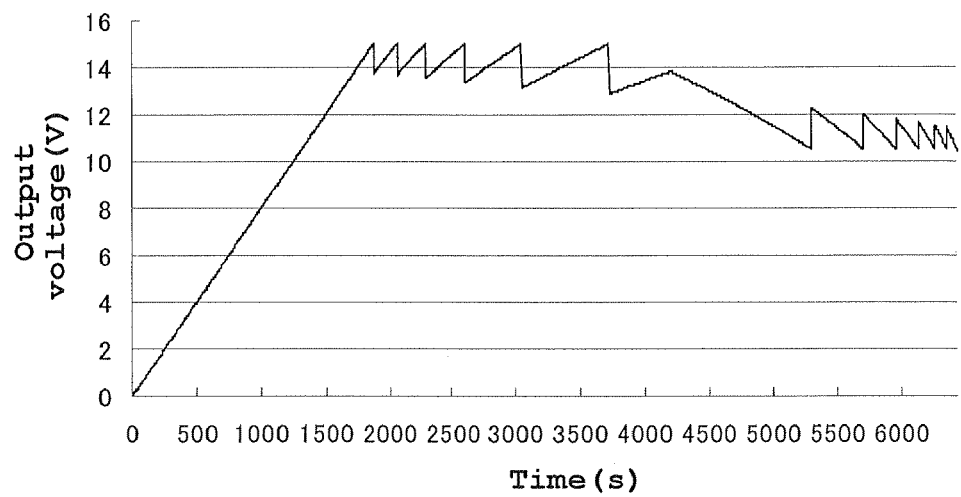
FIG. 19 is a characteristic chart showing the temporal change of the output voltage of the electric power storage system according to the embodiment 1.

Charging is performed using a constant current source of 2 [A], and after the EDLCs are fully charged, the constant current source is separated. Discharging is performed up to the minimum input voltage of the inverter with respect to a load, including the inverter, of 36 W. In this case, the simulation result of the charging/discharging temporal change in the device according to the present embodiment is shown in FIGS. 18 and 19. The simulation result of the charging/discharging temporal change with respect to each capacitor according to the conventional system under the same condition as that of the device according to the present embodiment is shown in FIG. 4, and the simulation result of the charging/discharging temporal change with respect to the output voltage of the electric power storage system according to the conventional system is shown in FIG. 5. The input voltage range of the inverter was set to 10.5 [V] to 15 [V]. The measurement of the inter-terminal voltage of each capacitor according to the present system, and the selection and switching of a block whose EDLCs are to be switched to serial-parallel connection so that the charges of each block are uniformly charged/discharged, were performed at an interval (5 seconds, for example).

FIGS. 4 and 5 show the temporal change of the inter-terminal voltage of each of the twelve capacitors in the conventional system and the temporal change of the output voltage of the electric power storage system, respectively. FIGS. 18 and 19 show the temporal change of the inter-terminal voltage of each of the twelve capacitors in the present system and the temporal change of the output voltage of the electric power storage system, respectively.

From the above result, it is found that, in the present system, the charging time is reduced more than 16% (the charging time being 5015 seconds in the conventional system and 4210 seconds in the present system) compared to the conventional system. This means that when the DC current source 11 is a solar cell, the area of the solar cell can be reduced more than 16%, significantly contributing to cost reduction of the entire photovoltaic power generation and electric storage system.

Also, as shown in FIG. 4, it can be seen that in the conventional system, a variation in inter-terminal voltage is observed between each of the twelve capacitors, and the charge of a capacitor in which the withstand voltage has been reached is wasted by the resistance of the voltage equalizing circuit. Specifically, the voltage equalization loss is large. In contrast, in the present system shown in FIG. 18, it is found that the twelve capacitors are each charged/discharged while the inter-terminal voltage thereof remains approximately at the same value at all times. This difference leads to the noticeable difference of charging time. From these results, it becomes evident that the voltage equalization loss of the present system is significantly smaller than that of the conventional bank switching system. Also, while the average depth of discharge of the conventional system is 81.8%, the average depth of discharge of the present system is 85.7%. Thus it is evident that the depth of discharge is also improved in the present system.

The term "Depth of discharge" refers to an index representing the use efficiency of electric storage energy accumulated in an EDLC, and is defined by the following formula (2), where $U_{Max}$ is the amount of the maximum electric storage energy, and $U_{rem}$ is the amount of residual electric storage energy.

$$\text{Depth of discharge [\%]} = (1 - U_{rem}/U_{max}) \times 100 \quad (2)$$

The amount of electric storage energy of an EDLC is defined by formula (3), where $V_c$ is the inter-terminal voltage of the EDLC.

$$U = CV_c^2/2 \quad (3)$$

From formulas (2) and (3), there is obtained formula (4), where $V_{Cmax}$ is the EDLC inter-terminal voltage (withstand voltage) corresponding to the maximum electric storage energy, and $V_{Crem}$ is the EDLC inter-terminal voltage corresponding to the residual electric storage energy.

$$\text{Depth of discharge [\%]} = (1 - V_{crem}^2/V_{Cmax}^2) \times 100 \quad (4)$$

According to the present embodiment, as shown in FIG. 7, switches 23 are provided between the circuit blocks connected in series of the capacitor group 13, and from among the switches, the control circuit 17 turns off the switches 23 positioned between circuit blocks having EDLCs connected in parallel. The present embodiment benefits from the following point in comparison to when the switches 23 are not provided.

For example, a case shown in FIG. 20 where the capacitor group is constituted of three blocks will be described. FIG. 20A shows the circuit of FIG. 1, i.e., a system with no switch provided between circuit blocks. FIG. 20B shows the present system. In both the systems, the first-stage block is connected in series. When the capacitors of the respective second-stage blocks are $C_1$ and $C_2$, and the capacitors of the respective third-stage blocks are $C_3$ and $C_4$, the combined capacitance $C_a$ of a section enclosed by a broken line shown in FIG. 20A in the system with no switch provided between circuit blocks is expressed as formula (5).

$$C_a = (C_1 C_3 + C_1 C_4 + C_2 C_3 + C_2 C_4)/(C_1 + C_2 + C_3 + C_4) \quad (5)$$

The combined capacitance $C_b$ of a section enclosed by a broken line shown in FIG. 20B in the present system is expressed as formula (6).

$$C_b = (C_1 C_2 C_3 + C_1 C_3 C_4 + C_1 C_2 C_4 + C_2 C_3 C_4)/(C_1 C_3 + C_1 C_4 + C_2 C_3 + C_2 C_4) \quad (6)$$

When an electric power storage system is constructed, capacitors with the same standard are usually used. Here, when the standard capacitance of the capacitors is C and the capacitance error of each of the capacitors is $\Delta_i$ (i=1, 2, ... 4, $\Delta_i \ll C$), $C_1 = C + \Delta_1$, $C_2 = C + \Delta_2$, $C_3 = C + \Delta_3$, and $C_4 = C + \Delta_4$.

When these formulas are assigned to formulas (5) and (6), the terms $\Delta_i \Delta_j$ (i=1, 2, ... 4, j=1, 2, ... 4, i≠j) and $\Delta_i \Delta_j \Delta_k$ (i=1, 2, ... 4, j=1, 2, ... 4, k=1, 2, ... 4, i≠j, j≠k, k≠i) are neglected as minor items, and $\Delta_1 \Delta_2 \Delta_3 \Delta_4 = \Delta$, then $$Ca \approx 2C(2C+\Delta)/4C+\Delta$$

$$Cb \approx C^2(4C+3\Delta)/2C(2C+\Delta)$$

Consequently, $C_a - C_b = C^2 \Delta^2 / 2C (2C+\Delta) (4C+\Delta) \geq 0$. Thus it is found that the combined capacitance $C_a$ of the section enclosed by a broken line shown in FIG. 20A according to the system with no switch provided between circuit blocks is larger at all times than the combined capacitance $C_b$ of the section enclosed by a broken line shown in FIG. 20B according to the present system.

In a charging process, generally, the amount of charge accumulated in each EDLC of a circuit block having EDLCs connected in parallel is half the amount of charge accumulated in each EDLC of a circuit block having EDLCs connected in series. Accordingly, the charging speed of the circuit block having EDLCs connected in parallel is sharply reduced. However, the combined capacitance $C_b$ of the section enclosed by a broken line shown in FIG. 20B according to the present system is smaller than the combined capacitance $C_a$ of the section enclosed by a broken line shown in FIG. 20A according to the system with no switch provided between circuit blocks. Accordingly, compared to the system with no switch provided between circuit blocks, the present system requires a shorter time taken for the EDLCs of a circuit block having EDLCs connected in parallel to be charged.

Even when the control method according to the present system is applied to the circuit of FIG. 1, the charging time is reduced 11% (the charging time is reduced to 4465 seconds when the control method according to the present system is applied to the circuit of FIG. 1), and the depth of discharge is also evidently improved (the depth of discharge is 85.9% when the control method according to the present system is applied to the circuit of FIG. 1). Thus the usability of the control method according to the present system was confirmed even with the circuit of FIG. 1.

The present invention is not limited to the embodiment described above, and it is possible to implement the following variations.

(1) In the embodiment described above, a DC-AC inverter 18 is used. However, a DC-DC converter may be used.

(2) In the embodiment described above, each circuit block of the capacitor group 13 includes two capacitors (EDLCs). However, the number of capacitors may be equal to or larger than three. Further, the present invention is also applicable when the number of capacitors (EDLCs) of a part of the circuit blocks is different from that of the other circuit blocks.

(3) In the embodiment described above, an EDLC is used as the capacitor of each circuit block of the capacitor group 13. However, a capacitor of another kind may be used.

INDUSTRIAL APPLICABILITY

As described above, according to the present invention, an electric power storage system not dependent on the capacitance error of each capacitor can be constructed, and a system having a high charging/discharging efficiency and costing less can be constructed. When a large magnitude of power is handled, also, the present invention is useful.

The invention claimed is:

1. An electric power storage system using capacitors, the system comprising:

power storage means having a circuit configuration in which n circuit blocks are connected in series, where n is a natural number equal to or larger than two, each of the n circuit blocks including a plurality of capacitors;

DC-AC conversion means that converts a DC output voltage from the power storage means into an AC output voltage and supplies the AC voltage to a load;

serial-parallel switching means that switches, between parallel and series, a connection of the plurality of capacitors in each circuit block of the power storage means;

a plurality of overcharge prevention means, each of which connected in parallel to each of the plurality of capacitors in the power storage means, and has the corresponding capacitor forcibly discharge when a terminal voltage of the capacitor reaches a withstand voltage value;

inter-terminal voltage detection means which detects an inter-terminal voltage between the plurality of capacitors of each circuit block of the power storage means;

block voltage determination means that determines a block voltage, for each circuit block, based on the inter-terminal voltage of each capacitor detected by the inter-terminal voltage detection means, the block voltage being a voltage of the circuit block; and control means that detects the output voltage of the power storage means and controls the serial-parallel switching means according to a value of the detected voltage, wherein when the power storage means is being charged, the control means performs:

a first process of controlling the serial-parallel switching means so that the plurality of capacitors of each circuit block of the power storage means are connected in series at the beginning of charging the power storage means;

a second process of controlling the serial-parallel switching means, when the output voltage of the power storage means reaches a maximum input voltage of the DC-AC conversion means, so that the connection of the plurality of capacitors of each of j circuit blocks in the descending order of block voltages determined by the block voltage determination means are switched to the parallel connection, where j is a natural number up to n indicating the number of times that an input voltage reaches the maximum input voltage during one charging process; and a third process of controlling the serial-parallel switching means, where j<n, after the connection of the plurality of capacitors of each of j circuit blocks are switched to the parallel connection in the second process until the output voltage of the power storage means reaches the maximum input voltage of the DC-AC conversion means again, so that the connection of the plurality of capacitors of each of j circuit blocks selected anew in the descending order of the block voltages determined anew by the block voltage determination means are switched to the parallel connection, and that the plurality of capacitors of j circuit blocks rather than the j circuit blocks selected anew among the j circuit blocks before selected anew, and when the power storage means is being discharged, the control means performs:

a fourth process of controlling the serial-parallel switching means so that the plurality of capacitors of each circuit block of the power storage means are connected in parallel at the beginning of discharging the power storage means;

a fifth process of controlling the serial-parallel switching means, when the output voltage of the power storage means reaches a minimum input voltage of the DC-AC conversion means, so that the connection of the plurality of capacitors of each of k circuit blocks in the descending order of block voltages determined by the block voltage determination means are switched to the serial connection, where k is a natural number up to n indicating the number of times that an input voltage reaches the minimum input voltage during one discharging process; and a sixth process of controlling the serial-parallel switching means, where k<n, after the connection of the plurality of capacitors of each of k circuit blocks are switched to the serial connection in the fifth process until the output voltage of the power storage means reaches the minimum input voltage of the DC-AC conversion means again, so that the connection of the plurality of capacitors of each of k circuit blocks in the descending order of the block voltages determined anew by the block voltage determination means are switched to the serial connection, and that the plurality of capacitors of k circuit blocks rather than the k circuit blocks selected anew among the j circuit blocks before selected anew:

wherein j is incremented during the second process but remains constant during the third process, and wherein k is incremented during the fifth process but remains constant during the sixth process.

2. An electric power storage system using capacitors, the system comprising:

power storage means having a circuit configuration in which n circuit blocks are connected in series, where n is a natural number equal to or larger than two, each of the n circuit blocks including a plurality of capacitors;

DC-DC conversion means that converts a DC output voltage from the power storage means into a predetermined DC output voltage and supplies the DC voltage to a load;

serial-parallel switching means that switches, between parallel and series, a connection of the plurality of capacitors in each circuit block of the power storage means;

a plurality of overcharge prevention means, each of which connected in parallel to each of the plurality of capacitors in the power storage means, and has the corresponding capacitor forcibly discharge when a terminal voltage of the capacitor reaches a withstand voltage value;

inter-terminal voltage detection means which detects an inter-terminal voltage between the plurality of capacitors of each circuit block of the power storage means;

block voltage determination means that determines a block voltage, for each circuit block, based on the inter-terminal voltage of each capacitor detected by the inter-terminal voltage detection means, the block voltage being a voltage of the circuit block; and control means that detects the output voltage of the power storage means and controls the serial-parallel switching means according to a value of the detected voltage, wherein when the power storage means is being charged, the control means performs:

a first process of controlling the serial-parallel switching means so that the plurality of capacitors of each circuit block of the power storage means are connected in series at the beginning of charging the power storage means;

a second process of controlling the serial-parallel switching means, when the output voltage of the power storage means reaches a maximum input voltage of the DC-DC conversion means, so that the connection of the plurality of capacitors of each of j circuit blocks in the descending order of block voltages determined by the block voltage determination means are switched to the parallel connection, where j is a natural number up to n indicating the number of times that an input voltage reaches the maximum input voltage during one charging process; and a third process of controlling the serial-parallel switching means, where j<n, after the connection of the plurality of capacitors of each of j circuit blocks are switched to the parallel connection in the second process until the output voltage of the power storage means reaches the maximum input voltage of the DC-DC conversion means again, so that the connection of the plurality of capacitors of each of j circuit blocks selected anew in the descending order of the block voltages determined anew by the block voltage determination means are switched to the parallel connection, and that the plurality of capacitors of j circuit blocks rather than the j circuit blocks selected anew among the j circuit blocks before selected anew, and when the power storage means is being discharged, the control means performs:

a fourth process of controlling the serial-parallel switching means so that the plurality of capacitors of each circuit block of the power storage means are connected in parallel at the beginning of discharging the power storage means;

a fifth process of controlling the serial-parallel switching means, when the output voltage of the power storage means reaches minimum input voltage of the DC-DC conversion means, so that the connection of the plurality of capacitors of each of k circuit blocks in the descending order of block voltages determined by the block voltage determination means are switched to the serial connection, where k is a natural number up to n indicating the number of times that an input voltage reaches the minimum input voltage during one discharging process; and a sixth process of controlling the serial-parallel switching means, where k<n, after the connection of the plurality of capacitors of each of k circuit blocks are switched to the serial connection in the fifth process until the output voltage of the power storage means reaches the minimum input voltage of the DC-DC conversion means again, so that the connection of the plurality of capacitors of each of k circuit blocks in the descending order of the block voltages determined anew by the block voltage determination means are switched to the serial connection, and that the plurality of capacitors of k circuit blocks rather than the k circuit blocks selected anew among the j circuit blocks before selected anew wherein j is incremented during the second process but remains constant during the third process, and wherein k is incremented during the fifth process but remains constant during the sixth process.

3. The electric power storage system using capacitors according to claim 1 or 2, wherein the control means performs the third process and sixth process each time when a predetermined interval passes.

4. The electric power storage system using capacitors according to claim 1 or 2, wherein the control means selects the charging control or the discharging control of the power storage means based on a comparison between an input current to the power storage means and an output current from the power storage means.

5. The electric power storage system using capacitors according to claim 1 or 2, wherein:
switches for selecting conduction or non-conduction are provided between each two circuit blocks of the power storage means; and
the control means turns off a switch out of the switches that is positioned between the circuit blocks in which the capacitors are connected in parallel.

6. The electric power storage system using capacitors according to claim 1 or 2, wherein when the power storage means is charged or discharged, the control means performs a seventh process of setting a lowest inter-terminal voltage out of inter-terminal voltages of the capacitors of one block detected by the inter-terminal voltage detection means as a reference value, and of controlling the overcharge prevention means so that a capacitor having an inter-terminal voltage exceeding a value of the lowest inter-terminal voltage added by a tolerance out of the capacitors of the circuit block is forcibly discharged.

7. The electric power storage system using capacitors according to claim 6, wherein the control means performs the seventh process each time when a predetermined interval passes.

8. A control method for an electric power storage system using capacitors, the method performing:
when a power storage means is charged;
a first process of controlling a serial-parallel switching means so that a plurality of capacitors of each of n circuit blocks of the power storage means, where n is a natural number equal to or larger than two are connected in series at the beginning of charging the power storage means;
a second process of controlling the serial-parallel switching means, when the output voltage of the power storage means reaches a maximum input voltage of a DC-AC conversion means, so that the connection of the plurality of capacitors of each of j circuit blocks in the descending order of block voltages determined by a block voltage determination means are switched to a parallel connection, where j is a natural number up to n indicating the number of times that an input voltage reaches the maximum input voltage during one charging process; and
a third process of controlling the serial-parallel switching means, where j<n, after the connection of the plurality of capacitors of each of j circuit blocks are switched to the parallel connection in the second process until the output voltage of the power storage means reaches the maximum input voltage of the DC-AC conversion means again, so that the connection of the plurality of capacitors of each of j circuit blocks selected anew in the descending order of the block voltages determined anew by the block voltage determination means are switched to the parallel connection, and that the plurality of capacitors of j circuit blocks rather than the j circuit blocks selected anew among the j circuit blocks before selected anew, and when the power storage means is being discharged,
a fourth process of controlling the serial-parallel switching means so that the plurality of capacitors of each circuit block of the power storage means are connected in parallel at the beginning of discharging the power storage means;
a fifth process of controlling the serial-parallel switching means, when the output voltage of the power storage means reaches a minimum input voltage of the DC-AC conversion means, so that the connection of the plurality of capacitors of each of k circuit blocks in the descending order of block voltages determined by the block voltage determination means are switched to the serial connection, where k is a natural number up to n indicating the number of times that an input voltage reaches the minimum input voltage during one discharging process; and
a sixth process of controlling the serial-parallel switching means, where k<n, after the connection of the plurality of capacitors of each of k circuit blocks are switched to the serial connection in the fifth process until the output voltage of the power storage means reaches the minimum input voltage of the DC-AC conversion means again, so that the connection of the plurality of capacitors of each of k circuit blocks in the descending order of the block voltages determined anew by the block voltage determination means are switched to the serial connection and that the plurality of capacitors of k circuit blocks rather than the k circuit blocks selected anew among the j circuit blocks before selected anew wherein j is incremented during the second process but remains constant during the third process, and wherein k is incremented during the fifth process but remains constant during the sixth process.

9. A control method for an electric power storage system using capacitors, the method performing:
when a power storage means is charged,
a first process of controlling a serial-parallel switching means so that a plurality of capacitors of each of n circuit blocks of the power storage means, where n is a natural number equal to or larger than two are connected in series at the beginning of charging the power storage means;
a second process of controlling the serial-parallel switching means, when the output voltage of the power storage means reaches a maximum input voltage of a DC-DC conversion means, so that the connection of the plurality of capacitors of each of j circuit blocks in the descending order of block voltages determined by a block voltage determination means are switched to a parallel connection, where j is a natural number up to n indicating the number of times that an input voltage reaches the maximum input voltage during one charging process; and
a third process of controlling the serial-parallel switching means, where j<n, after the connection of the plurality of capacitors of each of j circuit blocks are switched to the parallel connection in the second process until the output voltage of the power storage means reaches the maximum input voltage of the DC-DC conversion means again, so that the connection of the plurality of capacitors of each of j circuit blocks selected anew in the descending order of the block voltages determined anew by the block voltage determination means are switched to the parallel connection, and that the plurality of capacitors of j circuit blocks rather than the j circuit blocks selected anew among the j circuit blocks before selected anew, and when the power storage means is being discharged, a fourth process of controlling the serial-parallel switching means so that the plurality of capacitors of each circuit block of the power storage means are connected in parallel at the beginning of discharging the power storage means;

a fifth process of controlling the serial-parallel switching means, when the output voltage of the power storage means reaches minimum input voltage of the DC-DC conversion means, so that the connection of the plurality of capacitors of each of k circuit blocks in the descending order of block voltages determined by the block voltage determination means are switched to the serial connection, where k is a natural number up to n indicating the number of times that an input voltage reaches the minimum input voltage during one discharging process; and a sixth process of controlling the serial-parallel switching means, where k<n, after the connection of the plurality of capacitors of each of k circuit blocks are switched to the serial connection in the fifth process until the output voltage of the power storage means reaches the minimum input voltage of the DC-DC conversion means again, so that the connection of the plurality of capacitors of each of k circuit blocks in the descending order of the block voltages determined anew by the block voltage determination means are switched to the serial connection, and that the plurality of capacitors of k circuit blocks rather than the k circuit blocks selected anew among the j circuit blocks before selected anew wherein j is incremented during the second process but remains constant during the third process, and wherein k is incremented during the fifth process but remains constant during the sixth process.

* * * * *